(12) United States Patent
Wang et al.

(10) Patent No.: US 12,509,076 B2
(45) Date of Patent: Dec. 30, 2025

(54) VEHICLE CONTROL METHOD AND APPARATUS, ELECTRONIC DEVICE, AND STORAGE MEDIUM

(71) Applicant: UISEE (SHANGHAI) AUTOMOTIVE TECHNOLOGIES LTD., Shanghai (CN)

(72) Inventors: Zihan Wang, Shanghai (CN); Zuoyue Han, Shanghai (CN)

(73) Assignee: UISEE (SHANGHAI) AUTOMOTIVE TECHNOLOGIES LTD., Shanghai (CN)

( * ) Notice: Subject to any disclaimer, the term of this patent is extended or adjusted under 35 U.S.C. 154(b) by 50 days.

(21) Appl. No.: 18/579,346

(22) PCT Filed: May 16, 2022

(86) PCT No.: PCT/CN2022/092955
§ 371 (c)(1),
(2) Date: Jan. 13, 2024

(87) PCT Pub. No.: WO2023/005354
PCT Pub. Date: Feb. 2, 2023

(65) Prior Publication Data
US 2024/0343249 A1 Oct. 17, 2024

(30) Foreign Application Priority Data
Jul. 30, 2021 (CN) .......................... 202110875573.9

(51) Int. Cl.
*B60W 30/12* (2020.01)

(52) U.S. Cl.
CPC ......... *B60W 30/12* (2013.01); *B60W 2510/20* (2013.01); *B60W 2552/50* (2020.02); *B60W 2552/53* (2020.02); *B60W 2710/207* (2013.01)

(58) Field of Classification Search
CPC ............ B60W 30/12; B60W 2510/20; B60W 2552/50; B60W 2552/53;
(Continued)

(56) References Cited

U.S. PATENT DOCUMENTS

| 2010/0145575 | A1 | 6/2010 | Switkes |
| 2013/0304322 | A1* | 11/2013 | Isaji ........................ B62D 6/00 701/41 |

(Continued)

FOREIGN PATENT DOCUMENTS

| CN | 108344997 | 7/2018 |
| CN | 111516685 | 8/2020 |

(Continued)

OTHER PUBLICATIONS

International Search Report mailed in PCT/CN2022/092955 date Jul. 22, 2023 (5 pages).

(Continued)

*Primary Examiner* — Joseph J Dallo
(74) *Attorney, Agent, or Firm* — Wissing Miller LLP

(57) ABSTRACT

A vehicle control method, includes: obtaining front lane line information and front guardrail information of a controlled vehicle; determining a lateral displacement deviation of the controlled vehicle according to at least one of the front lane line information and the front guardrail information, where the lateral displacement deviation is a lateral distance between a current position of the controlled vehicle and a preview position of the controlled vehicle; and according to the lateral displacement deviation, controlling the controlled vehicle to travel. A vehicle control apparatus, an electronic device, and a storage medium are further provided.

14 Claims, 7 Drawing Sheets

(58) Field of Classification Search
CPC ........... B60W 2710/207; B60W 30/14; B60W 2420/403; B60W 2554/801; B60W 2554/802; B60W 40/114; B60W 2552/00; B62D 15/025
See application file for complete search history.

(56) References Cited

U.S. PATENT DOCUMENTS

| | | | | |
|---|---|---|---|---|
| 2015/0225018 | A1* | 8/2015 | Oya | B62D 5/0463 |
| | | | | 701/41 |
| 2017/0120925 | A1* | 5/2017 | Stefan | G01C 21/3697 |
| 2018/0022383 | A1* | 1/2018 | Kunihiro | B62D 7/159 |
| | | | | 701/41 |
| 2018/0281790 | A1 | 10/2018 | Hajime | |
| 2019/0322277 | A1* | 10/2019 | Kuroki | B60W 30/16 |
| 2020/0070826 | A1 | 3/2020 | Akihiro | |
| 2021/0197828 | A1* | 7/2021 | Kumano | G06V 20/58 |

FOREIGN PATENT DOCUMENTS

| | | |
|---|---|---|
| CN | 110654458 | 1/2021 |
| CN | 112158198 | 1/2021 |
| CN | 112373474 | 2/2021 |
| CN | 112477847 | 3/2021 |
| CN | 112622899 | 4/2021 |
| CN | 112829753 | 5/2021 |
| CN | 112959994 | 6/2021 |
| CN | 113401121 | 9/2021 |
| JP | 2020032802 | 2/2021 |
| WO | WO-2019235327 A1 * 12/2019 | ............ B60W 30/12 |

OTHER PUBLICATIONS

Office Action mailed in corresponding CN 20211087573.9 on Apr. 13, 2022 (13 pages).

* cited by examiner

VEHICLE CONTROL METHOD AND APPARATUS, ELECTRONIC DEVICE, AND STORAGE MEDIUM

CROSS-REFERENCES TO RELATED APPLICATIONS

This is a National Stage Application, filed under 35 U.S.C. 371, of International Patent Application No. PCT/CN2022/092955, filed on May 16, 2022, which is based on and claims priority to Chinese Patent Application No. 202110875573.9, filed with the China National Intellectual Property Administration (CNIPA) on Jul. 30, 2021, the disclosure of each is incorporated herein in their entirety by reference.

TECHNICAL FIELD

Embodiments of the present application relate to the field of autonomous driving technology, for example, to a vehicle control method, a vehicle control apparatus, an electronic device and a storage medium.

BACKGROUND

With the advancement of technology, the assembly volume of L2 (Level 2) driving assistance system defined by the Society of Automotive Engineers (SAE) has grown rapidly in recent years. Functions of the L2 driving assistance systems generally include two functions of lane center keeping and full-speed adaptive cruise control. The two functions together realize the lateral control and longitudinal control of the vehicle in the current lane. The lane keeping system in the related art, in functioning, actively controls the torque or turning angle of the steering wheel to achieve lateral control of the vehicle, thereby continuously controlling the vehicle in the center of the lane.

SUMMARY

A vehicle control method, a vehicle control apparatus, an electronic device, and a storage medium are provided according to embodiments of the present application.

In a first aspect, a vehicle control method is provided according to embodiments of the present application, which includes as follows.

Front lane line information and front guardrail information of a controlled vehicle is obtained.

According to at least one of the front lane line information and the front guardrail information, a lateral displacement deviation of the controlled vehicle is determined. Specifically, the lateral displacement deviation is a lateral distance between a current position of the controlled vehicle and a preview position of the controlled vehicle.

According to the lateral displacement deviation, the controlled vehicle is controlled to travel.

In a second aspect, a vehicle control apparatus is further provided according to embodiments of the present application, which includes: a front information obtaining module, a lateral displacement deviation calculation module and a vehicle travelling control module.

The front information obtaining module is configured to obtain front lane line information and front guardrail information of the controlled vehicle.

The lateral displacement deviation calculation module is configured to determine a lateral displacement deviation of the controlled vehicle according to at least one of the front lane line information and the front guardrail information. The lateral displacement deviation is a lateral distance between a current position of the controlled vehicle and a preview position of the controlled vehicle.

The vehicle travelling control module is configured to, according to the lateral displacement deviation, control the controlled vehicle to travel.

In a third aspect, an electronic device is further provided according to embodiments of the present application. The electronic device includes: at least one processor, and a storage device configured to store at least one program. The at least one processor is configured to execute the at least one program to implement the vehicle control method according to any embodiment of the present application.

In a fourth aspect, a computer storage medium is further provided according to embodiments of the present application, a computer program is stored on the computer storage medium. The computer program, when being executed by a processor, implements the vehicle control method according to any embodiment of the present application.

DETAILED DESCRIPTION

Figure 1:
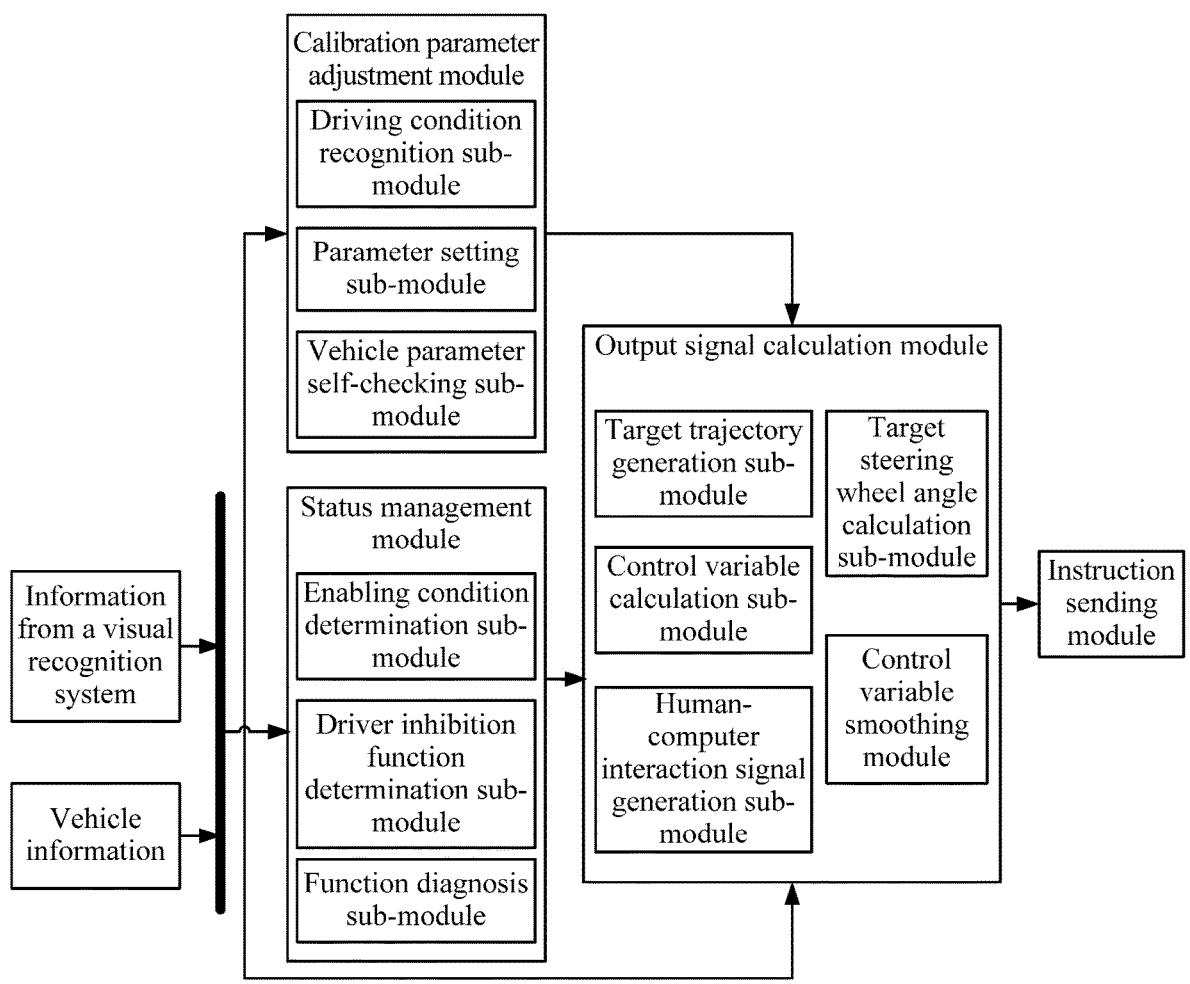
FIG. 1 is a schematic structural diagram of a lane keeping system according to an embodiment of the present application.

The lateral control method in the related art can be enabled mainly when the lane line quality is high, and the function is quit when the lane line quality is poor. That is to say, the lane keeping system highly relies on visual lane line information and cannot achieve lateral control of the vehicle when the lane line quality is poor or no lane lines exist, which adversely affects the driving experience. In order to cope with the above situation, a vehicle control method, a vehicle control apparatus, an electronic device and a storage medium are provided according to embodiments of the present application. The present application is described hereinafter in conjunction with the drawings and embodiments.

In addition, some example embodiments are described as processes or methods depicted as flowcharts. Although the flowcharts depict multiple operations (or steps) as a sequential process, many operations may be performed in parallel, concurrently, or simultaneously. Furthermore, the order of multiple operations can be rearranged. The process may be terminated when the operations are completed and may have additional steps not included in the drawing. The process may correspond to a method, a function, a procedure, a subroutine, a subprogram, or the like.

The terms "first" and "second" in the description, claims, and drawings of the embodiments of this application are used to distinguish different objects, rather than describing a specific sequence. Furthermore, the terms "including" and "having" and any variations thereof are intended to cover non-exclusive inclusion. For example, the process, method, system, product or device that contains a series of steps or units may include steps or units that have been listed, or may further include steps or units that are not listed.

FIG. 1 is a schematic structural diagram of a lane keeping system according to an embodiment of the present application. As shown in FIG. 1, the lane keeping system receives information from an external visual recognition system and vehicle information, and sends control instructions through an instruction sending module. The lane keeping system may include: a status management module, a calibration parameter adjustment module and an output signal calculation module. Specifically, the status management module is configured to determine current functional status of a lane keeping systems (LKS) according to sensory information (for example, information obtained by the visual recognition system or a sensor), vehicle information (for example, vehicle speed, a brake pedal, an accelerator pedal and corresponding vehicle diagnostic signals) and a driver input. The calibration parameter adjustment module is configured to dynamically adjust real-time calibration parameters according to the set calibration parameters based on dynamic statuses of lane lines and vehicle information (for example, dynamically adjusting static deviations of a steering wheel according to lane lines and vehicle information to complete online self-calibration of the system). The output signal calculation module is configured to output a current functional status, a vehicle signal and a calibration signal and calculate the output signals.

In the embodiment of the present application, the status management module may further include an enabling condition determination sub-module, a driver inhibition function determination sub-module and a function diagnosis sub-module. The calibration parameter adjustment module may further include a driving condition recognition sub-module, a parameter setting sub-module and a vehicle parameter self-checking sub-module. Specifically, the driving condition recognition sub-module is configured to recognize the driving condition of the vehicle, for example, a straight line or a curve; the parameter setting sub-module is configured to adjust control parameters according to vehicle speed and recognized driving conditions; and the vehicle parameter self-checking sub-module is configured to monitor a static deviation of a vehicle steering wheel angle in real time and adaptively correct the vehicle steering wheel angle when the deviation is large. The output signal calculation module may further include a target trajectory generation sub-module, a control variable calculation sub-module, a human-computer interaction signal generation sub-module, a target steering wheel angle calculation sub-module and a control variable smoothing module. For example, the status management module can manage the functional status of the vehicle from a top-level perspective. The functional statuses of the vehicle may include: Disable, Standby, Ready To Assist, Fail, and Active, etc. In the above modules, the calculation function of vehicle control is mainly performed by the control variable calculation sub-module and the target steering wheel angle calculation sub-module.

Embodiment One

Figure 2:
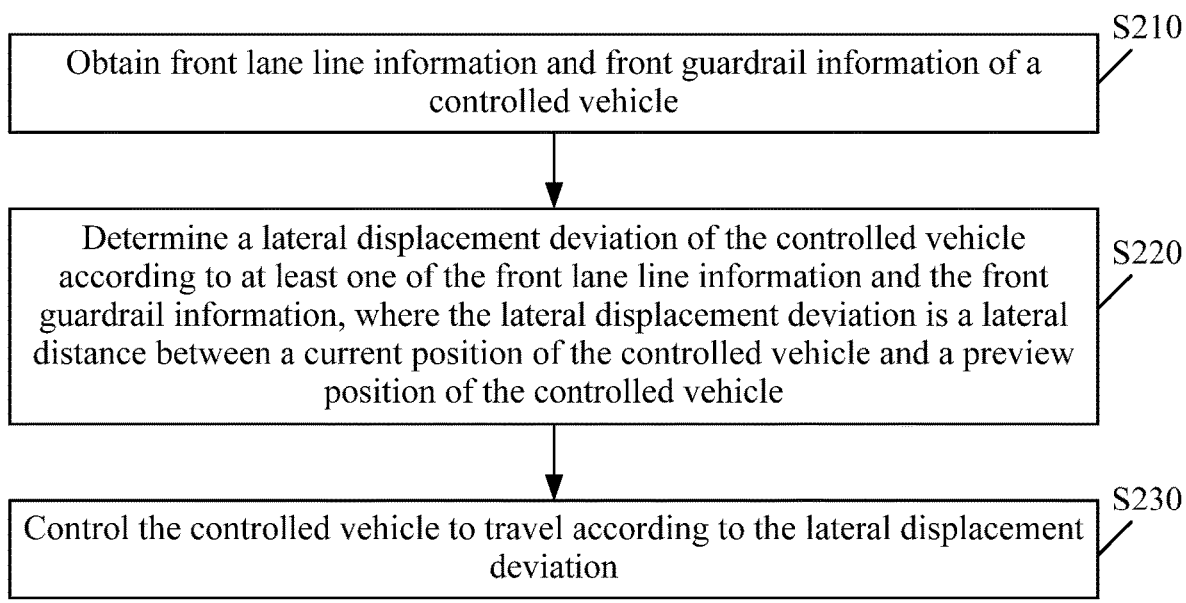
FIG. 2 is a flow chart of a vehicle control method according to embodiment one of the present application.

FIG. 2 is a flow chart of a vehicle control method according to embodiment one of the present application. In this embodiment, the vehicle is controlled according to multi-dimensional influencing factors. The method can be executed by a vehicle control apparatus, and the apparatus can be embodied as software and/or hardware, and generally can be integrated in the electronic device that executes the method. The electronic device can be a control device integrated in the vehicle, etc., and can integrate the lane keeping system to realize the vehicle control function. As shown in FIG. 2, the vehicle control method may include the following operations: S210, S220 and S230.

In S210, front lane line information and front guardrail information of a controlled vehicle is obtained.

The front lane line information may be information about a lane line ahead of the vehicle, for example, it may be lane lines on both sides in front of the vehicle, or it may be a lane line on any side in front of the vehicle, etc., or it may also be that no lane line exists. The front guardrail information may further include parameters associated with the front guardrail, or may be empty. The front guardrail can be a guardrail in front of the vehicle that can be used to correct the lane line to calculate the lateral displacement deviation or directly calculate the lateral displacement deviation. The front guardrail in this state may also be recorded as a front high-quality guardrail, the so-called high quality means that the credibility of the guardrail is higher than the credibility of the lane line (the credibility of the guardrail is used to determine whether the quality of the guardrail meets tracking conditions, for example, if the quality of the front guardrail is not high or the deviation is large, the front guardrail is not selected here for lateral control). In an embodiment, the front guardrails may be guardrails on both sides in front of the vehicle, or may be a guardrail on any side in front of the vehicle, etc. The front guardrail associated parameters may be relevant parameters calculated according to the front guardrail information, and can be used to calculate a lateral displacement deviation of the vehicle when lateral control is performed on the vehicle according to the front guardrail.

In the embodiment of the present application, the obtaining the front lane line information of the controlled vehicle may include: the lane keeping system obtaining information of lane lines on both sides in front of the controlled vehicle, or the lane keeping system obtaining information of a lane line on any side in front of the controlled vehicle. If no lane line exists in front of the controlled vehicle, the front lane line information can be empty. The obtaining the front guardrail information of the controlled vehicle may include: the lane keeping system obtaining information of guardrails on both sides in front of the controlled vehicle, or the lane keeping system obtaining information of a guardrail on any side in front of the controlled vehicle. If no guardrail exists in front of the controlled vehicle, the front guardrail information can be empty.

In an embodiment, the front guardrail can be determined according to the method as follows. In a case where in a case where that the front guardrail information includes information of a one-side front guardrail, and the distance between the one-side front guardrail and the controlled vehicle is less than a half width of the single lane, it means that the one-side front guardrail is the guardrail of the lane where the vehicle is located, then it can be determined that the one-side front guardrail is the front guardrail. The one-side front guardrail can be a guardrail on any side in front of the vehicle, for example, it can be a guardrail at left side of the vehicle or a guardrail at right side of the vehicle. In a case where in a case where the front guardrail information includes both-side front guardrail information, and the distance between a target-side front guardrail in the both-side front guardrails and the controlled vehicle is less than the half width of the single lane, it means that the target-side front guardrail is the guardrail of the lane where the vehicle is located, then the target-side front guardrail can be determined as the front guardrail. The half width of the single lane can be half of the width of a single lane. For example, if the width of a single lane is 5 meters, the half width of the single lane can be 2.5 meters. The target-side front guardrail can be the guardrail on any side of the both-side guardrails determined when there are both-side guardrails in front of the vehicle. In a case where in a case where that the front guardrail information includes both-side front guardrail information, and the distances between the controlled vehicle and the front guardrails on both sides are both less than the half width of the single lane, it means that the both-side front guardrails are both guardrails of the lane where the vehicle is located, thus the front guardrail on any side can be determined as the front guardrail. In a case where the front guardrails on both sides are guardrails, the guardrail on the right side of the controlled vehicle can be selected as the front guardrail.

In S220, a lateral displacement deviation of the controlled vehicle is determined according to at least one of the front lane line information and the front guardrail information. Specifically, the lateral displacement deviation is a lateral distance between a current position of the controlled vehicle and a preview position of the controlled vehicle.

The lateral displacement deviation may be the lateral distance between the current position of the controlled vehicle and the preview position of the controlled vehicle, which can be used to control the vehicle to travel at a suitable position in the current lane. For example, the preview position is the coordinates of a certain preview point in front of the vehicle, including a longitudinal position and a lateral position, and is an expected front traveling position of the vehicle.

In this embodiment of the present application, after the lane keeping system obtains the front lane line information and the front guardrail information of the controlled vehicle, and if the front lane line information includes both-side lane line information (i.e., information of lane lines on both sides) and the front guardrail information is empty, the lane keeping system can calculate the lateral displacement deviation of the controlled vehicle according to the front lane line information. If the front lane line information is empty and the front guardrail information is not empty (for example, the front guardrail information includes a front guardrail (also called a front high-quality guardrail)), a lateral displacement deviation of the controlled vehicle can be calculated according to the front guardrail information. If neither the front lane line information nor the front guardrail information is empty, a lateral displacement deviation of the controlled vehicle, etc. can be calculated according to the front lane line information and the front guardrail information.

In S230, the controlled vehicle is controlled to travel according to the lateral displacement deviation.

In this embodiment of the present application, after a lateral displacement deviation of the controlled vehicle is calculated, the controlled vehicle can be controlled according to the lateral displacement deviation to travel. The lateral displacement deviation of the controlled vehicle is calculated according to the front lane line information and/or the front guardrail information, thereby realizing that multiple influencing factors are introduced to calculate the lateral displacement deviation, which improves the vehicle control effect.

In this embodiment, the front lane line information and the front guardrail information of the controlled vehicle is obtained, and according to at least one of the front lane line information and the front guardrail information, the lateral distance between the current position of the controlled vehicle and the preview position of the controlled vehicle is determined as the lateral displacement deviation of the controlled vehicle, so as to control the controlled vehicle according to the lateral displacement deviation to travel, which can. In such way, the vehicle control method can be coped with the conditions of low accuracy and poor control effect in performing lateral control to the vehicle according to only the single lane line information, and can calculate the lateral displacement deviation of the vehicle according to multi-dimensional influencing factors, making the lateral displacement deviation more accurate and precise, thereby improving the accuracy of vehicle control and the control effect of vehicle control.

In an embodiment, the lateral displacement deviation may be based to calculate an expected front wheel steering angle or may be further converted into an expected steering torque, thereby controlling the controlled vehicle to travel.

Embodiment Two

Figure 3:
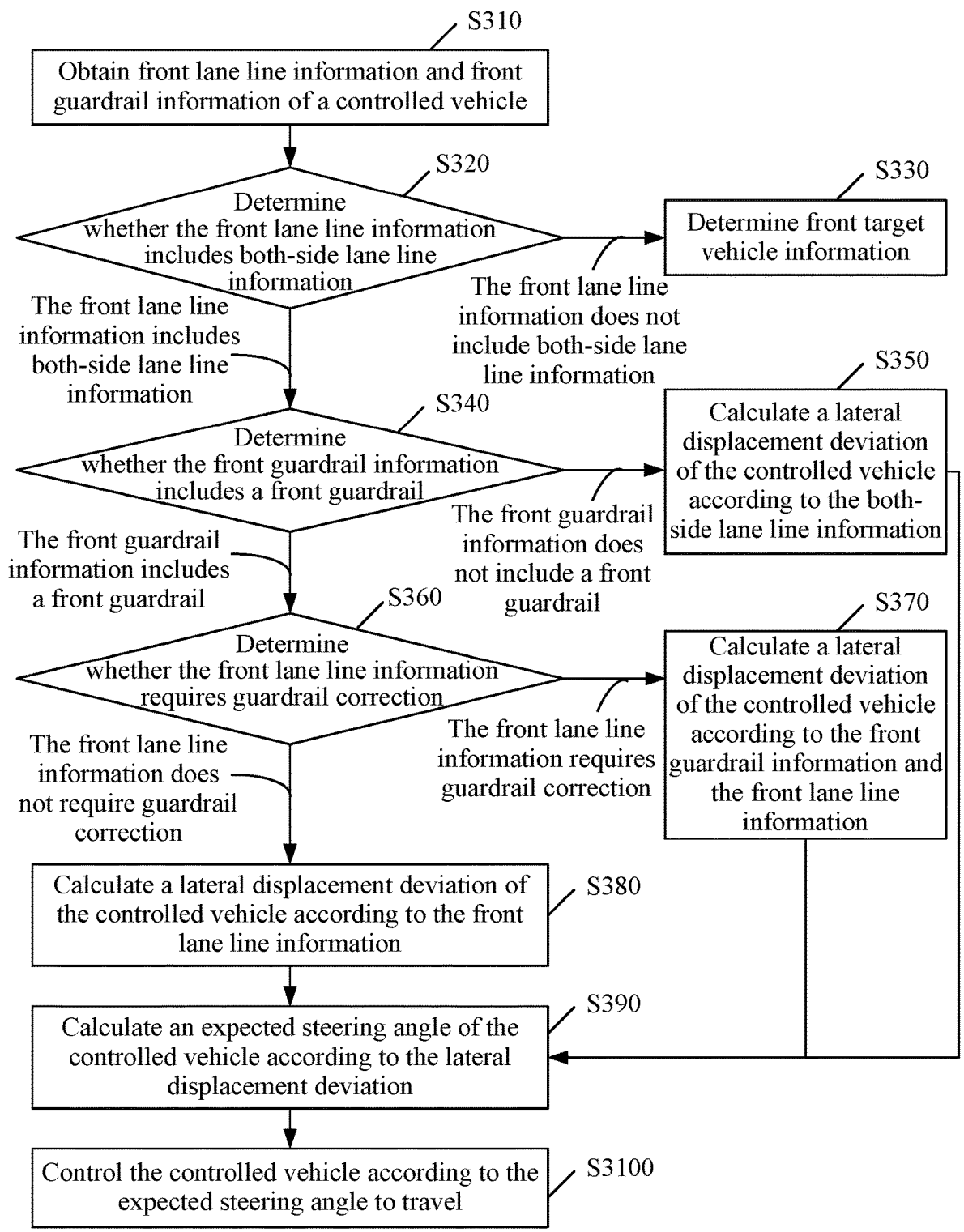
FIG. 3 is a flow chart of a vehicle control method according to embodiment two of the present application.

FIG. 3 is a flow chart of a vehicle control method according to embodiment two of the present application. This embodiment can be based on the above embodiment. In this embodiment, various implementations of the method for calculating a lateral displacement deviation of a controlled vehicle according to front lane line information and/or front guardrail information and controlling the controlled vehicle according to the lateral displacement deviation to travel are provided. The technical solution in this embodiment can be combined with each optional solution in one or more of the embodiments described above. As shown in FIG. 3, the method may include the following operations: S310 to S3100.

In S310, front lane line information and front guardrail information of a controlled vehicle is obtained.

In S320, whether the front lane line information includes both-side lane line information is determined.

If the front lane line information does not include both-side lane line information, S330 is executed. If the front lane line information includes both-side lane line information, S340 is executed. Both-side lane lines may be lane lines on both sides of a lane on which the vehicle is currently travelling.

In this embodiment of the present application, after the front lane line information of the controlled vehicle is obtained, whether the front lane line information includes the both-side lane line information can be determined. It can be understood that if the front lane line information does not include the both-side lane line information, front target vehicle information may be determined, so as to calculate a lateral displacement deviation of the controlled vehicle according to the front guardrail information and/or the front target vehicle information, thereby achieving lateral control of the vehicle when no both-side lane line information exists. If the front lane line information includes the both-side lane line information, then whether the front guardrail information includes a front guardrail is determined. In a case where the front guardrail information includes a front guardrail, whether the front lane line information requires guardrail correction can be determined. Alternatively, in a case where the front guardrail information is empty, a lateral displacement deviation of the controlled vehicle can be calculated directly according to the both-side lane line information.

In S330, front target vehicle information is determined.

The front target vehicle information can be information about a target vehicle travelling in front of the controlled vehicle on a current diving lane of the controlled vehicle, or the front target vehicle information can also be empty, that is, no front target vehicle exists on a current travelling lane of the controlled vehicle.

In this embodiment of the present application, after determining that the front lane line information does not include the both-side lane line information, the front target vehicle information is determined to calculate a lateral displacement deviation of the controlled vehicle according to the front guardrail information and/or the front target vehicle information, thereby achieving lateral control of the vehicle according to the front target vehicle information when no both-side lane line information exists.

For example, when a front target vehicle exists in front of the controlled vehicle, available distance information between the front target vehicle and the controlled vehicle may be determined as the front target vehicle information. Alternatively, when no front target vehicle exists in front of the controlled vehicle, the front target vehicle information is determined to be empty.

In S340, in a case where whether the front guardrail information includes a front guardrail.

If the front guardrail information is empty, S350 is executed, and if the front guardrail information includes a front guardrail, S360 is executed.

In this embodiment of the present application, after the front lane line information is determined to include both-side lane line information, whether the front guardrail information includes a front guardrail may be determined. For example, if the front guardrail information is empty, a lateral displacement deviation of the controlled vehicle can be calculated directly according to the both-side lane line information. If the front guardrail information includes a front guardrail, whether the front lane line information requires guardrail correction can be determined.

In S350, the lateral displacement deviation of the controlled vehicle is calculated according to the both-side lane line information.

In this embodiment of the present application, after in a case where that the front lane line information includes both-side lane line information and the front guardrail information is empty, a lateral displacement deviation of the controlled vehicle can be calculated according to the both-side lane line information.

In S360, in a case where whether the front lane line information requires guardrail correction.

If the front lane line information requires guardrail correction, S370 is executed, and if the front lane line information does not require guardrail correction, S380 is executed.

The guardrail correction may refer to that the front lane line information is corrected according to the front guardrail information to prevent the vehicle from colliding with the guardrail when the guardrail is at an inner side of the lane line of the current travelling lane.

In this embodiment of the present application, it can be determined that the front lane line information requires guardrail correction according to a first guardrail correction condition. Alternatively, it may be determined that the front lane line information does not require guardrail correction according to a second guardrail correction condition.

The first guardrail correction condition may be one condition for guardrail correction, which is used to determine that the front lane line information requires guardrail correction. The second guardrail correction condition may be another condition for guardrail correction, which is used to determine that the front lane line information does not require guardrail correction.

For example, when to determine whether the front lane line information requires guardrail correction, it may be determined that the front lane line information requires guardrail correction according to the first guardrail correction condition, or it may be determined that the front lane line information does not require guardrail correction according to the second guardrail correction condition.

In this embodiment of the present application, after the front lane line information is determined to include both-side lane line information and determined that the front guardrail information includes a front guardrail, whether the front lane line information requires guardrail correction can be determined. It can be understood that if the guardrail is at the inner side of the lane line of the current travelling lane, it means that the distance between the guardrail and the vehicle is smaller than the distance between the lane line and the vehicle. In this case, if a vehicle travelling route is determined according to the front lane line information, it is possible to cause the vehicle to collide with the guardrail, that is, it requires to perform guardrail correction on the front lane line information according to the front guardrail information to prevent the vehicle from colliding with the guardrail. Accordingly, if the guardrail is at an outer side of the lane line of the current travelling lane, it means that the distance between the guardrail and the vehicle is greater than the distance between the lane line and the vehicle. That is, a travelling route of the vehicle determined according to the front lane line information will not cause the vehicle to collide with the guardrail, and in this case, it does not require to perform guardrail correction on the front lane line information.

In S370, a lateral displacement deviation of the controlled vehicle is calculated according to the front guardrail information and the front lane line information.

In this embodiment of the present application, after the front lane line information is determined to include both-side lane line information, the front guardrail information is not empty, and the front lane line information is determined to require guardrail correction, a lateral displacement deviation of the controlled vehicle can be determined according to both influencing factors, the front guardrail information and the front lane line information, to achieve precise lateral control of the vehicle, thereby enabling the vehicle to travel in an appropriate position of the current travelling lane and avoiding the impact of the guardrail on the safe travelling of the vehicle.

In this embodiment, a lateral displacement deviation of the controlled vehicle is calculated according to both influencing factors: the front guardrail information and the front lane line information, thereby increasing the fault tolerance and stability of the lane keeping system.

In S380, a lateral displacement deviation of the controlled vehicle is calculated according to the front lane line information.

In this embodiment of the present application, after the front lane line information is determined to include both-side lane line information, the front guardrail information is not empty, and determined that the front lane line information is determined to not require guardrail correction, a lateral displacement deviation of the controlled vehicle can be calculated according to the front lane line information, to achieve lateral control of the vehicle, thereby enabling the vehicle to travel in the center of the current travelling lane.

In an embodiment, when a lateral displacement deviation of the controlled vehicle is calculated according to the front lane line information and/or the front guardrail information, the following formula can be used to calculate the lateral displacement deviation of the controlled vehicle:

$$d_{fix1} = \begin{cases} F_{lane} \cdot d_{ct} + F_{rdg} \cdot d_{rdg} & d_{ct} < a_{rdg} + b_{rdg} \cdot D + c_{rdg} \cdot D^2 \\ d_{ct} & d_{ct} \geq a_{rdg} + b_{rdg} \cdot D + c_{rdg} \cdot D^2 \end{cases} \quad (2)$$

$$d_{ct} = a_{ct} + b_{ct} \cdot b_{lt} \cdot (t_p \cdot v) + c_{ct} \cdot (t_p \cdot v)^2 + d_{ct} \cdot (t_p \cdot v)^3 \quad (3)$$

where, $d_{fix1}$ denotes a lateral displacement deviation of the controlled vehicle calculated according to the front guardrail information and the front lane line information, or according to the front lane line information. $F_{lane}$ denotes a lane line weight coefficient, $F_{rdg}$ denotes a first guardrail weight coefficient, $d_{ct}$ denotes a lateral displacement deviation of the controlled vehicle calculated according to a lane centerline, $d_{rdg}$ denotes a lateral displacement deviation of the controlled vehicle calculated according to front guardrail-associated parameters (front guardrail geometric parameters), and $a_{rdg}$, $b_{rdg}$ and $c_{rdg}$ are the front guardrail-associated parameters. For example, the lane centerline is represented in a parametric form, namely $a_{ct}$, $b_{ct}$, $c_{ct}$ and $d_{ct}$.

In addition, in order to facilitate understanding, the symbols with rdg are information related to the guardrail, the symbols with lt are information related to the left lane line, the symbols with rt are information related to the right lane line, and the symbols with ct are information related to the lane centerline.

For example, a quadratic polynomial used to represent the front guardrail can be determined according to geographical location information of the front guardrail. $a_{rdg}$ denotes the intercept of a current position of the controlled vehicle calculated according to the front guardrail information, that is, a constant term in the polynomial of the front guardrail, $b_{rdg}$ denotes the slope of a current position of the controlled vehicle, of the guardrail calculated according to the front guardrail information, that is, a linear term coefficient in the polynomial of the front guardrail, $c_{rdg}$ denotes the curvature of a current position of the controlled vehicle calculated according to the front guardrail information, that is, a quadratic term coefficient in the polynomial of the front guardrail, and D denotes a calibration parameter of the detection distance of the controlled vehicle; $d_{ct} < a_{rdg} + b_{rdg} \cdot D + c_{rdg} \ast D^2$ denotes the first guardrail correction condition; $d_{ct} \geq a_{rdg} + b_{rdg} \cdot D + c_{rdg} \cdot D^2$ denotes the second guardrail correction condition.

For example, a cubic polynomial used to represent the lane centerline can be determined according to geographical location information of the lane centerline, that is, a formula (3) for calculating a lateral displacement deviation of the controlled vehicle, and $a_{ct}$ denotes the intercept of the current position of the controlled vehicle calculated according to the position of the lane centerline, that is, representing a constant term in the polynomial of the lane centerline, $b_{ct}$ denotes the slope of the current position of the controlled vehicle, of the lane centerline calculated according to the position of the lane centerline, that is, representing a linear term coefficient in the polynomial of the lane centerline, $c_{ct}$ denotes the curvature of the current position of the controlled vehicle, of the lane centerline calculated according to the position of the lane centerline, that is, a quadratic term coefficient in the polynomial of the lane centerline, $b_{lt}$ denotes the slope of the current position of the controlled vehicle, of the left lane line calculated according to the position of the left lane line, $t_p$ denotes a preview time, v denotes a travelling speed of the controlled vehicle.

For example, after determining that the current lane line information requires guardrail correction according to $d_{ct} < a_{rdg} + b_{rdg} \cdot D + c_{rdg} \cdot D^2$, a lateral displacement deviation of the controlled vehicle can be calculated according to the formula (1) and the formula (3). After determining that the current lane line information does not require guardrail correction according to $d_{ct} \geq a_{rdg} + b_{rdg} \cdot D + c_{rdg} \cdot D^2$, a lateral displacement deviation of the controlled vehicle can be calculated according to the formula (2) and the formula (3).

In S390, an expected steering angle of the controlled vehicle is calculated according to the lateral displacement deviation.

The expected steering angle may be an angle required to turn for the vehicle to travel in the center of the current lane, for example, a front wheel steering angle.

In this embodiment of the present application, after a lateral displacement deviation of the controlled vehicle is calculated, a target steering wheel angle calculation sub-module of the lane keeping system can calculate the expected steering angle of the controlled vehicle according to the lateral displacement deviation, so that the vehicle is controlled to travel according to the expected steering angle.

In an embodiment, the calculating an expected steering angle of the controlled vehicle according to the lateral displacement deviation may include: calculating an expected steering angle of the controlled vehicle according to the lateral displacement deviation by using the following formula:

$$\delta_f = \arctan\left(\frac{2 \cdot L \cdot d_{design}}{(t_p \cdot v)^2}\right)$$

where, $\delta_f$ denotes a front wheel steering angle of the controlled vehicle, L denotes a wheelbase of the controlled vehicle, $d_{design}$ denotes the lateral displacement deviation, $t_p$ denotes a preview time, and v denotes a travelling speed of the controlled vehicle.

In S3100, the controlled vehicle is controlled according to the expected steering angle to travel.

In this embodiment of the present application, after the expected steering angle of the controlled vehicle is calculated according to the lateral displacement deviation, the controlled vehicle can be controlled according to the expected steering angle to travel, thereby achieving lateral control of the vehicle.

In this embodiment, the front lane line information and the front guardrail information of the controlled vehicle is obtained, and in a case where the front lane line information includes the both-side lane line information, whether the front guardrail information includes a front guardrail is determined; if the front guardrail information is empty, then a lateral displacement deviation of the controlled vehicle is calculated according to the both-side lane line information;

if the front guardrail information is not empty, whether the front lane line information requires guardrail correction is determined; and when the front guardrail information is determined to require the guardrail correction according to the first guardrail correction condition, a lateral displacement deviation of the controlled vehicle is calculated according to the front guardrail information and the front lane line information; and when the front lane line information is determined to require the guardrail correction according to the second guardrail correction condition, a lateral displacement deviation of the controlled vehicle is calculated according to the front lane line information; an expected steering angle of the controlled vehicle is calculated according to the lateral displacement deviation, and the controlled vehicle is controlled according to the expected steering angle to travel. In such way, the vehicle control method can cope with the conditions of low accuracy and poor control effect in performing lateral control to the vehicle according to only the single lane line information, and can calculate a lateral displacement deviation of the vehicle according to multi-dimensional influencing factors, making the lateral displacement deviation more accurate and precise, thereby improving the accuracy of vehicle control and improving the control effect of vehicle control.

Embodiment Three

Figure 4:
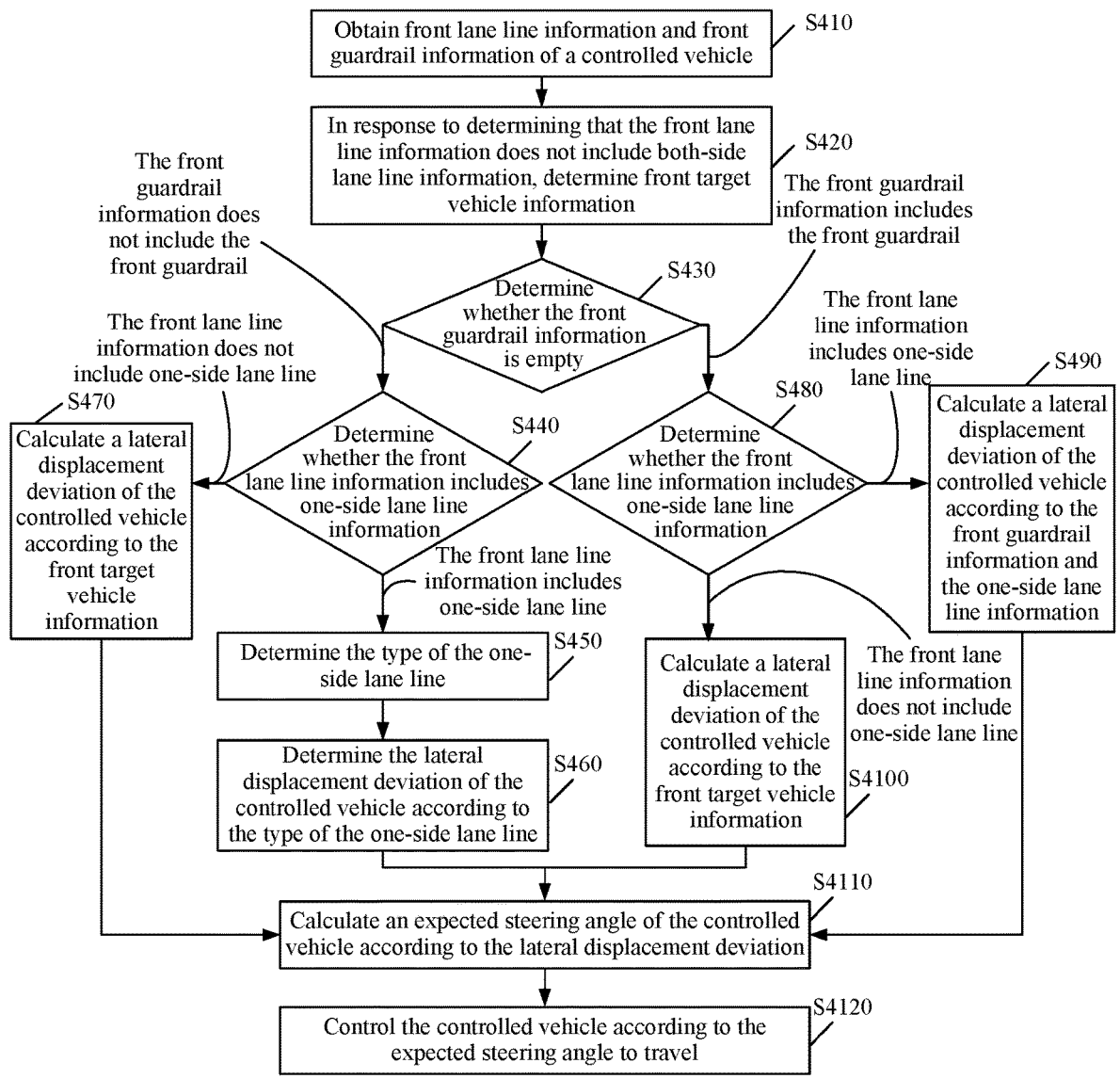
FIG. 4 is a flow chart of a vehicle control method according to embodiment three of the present application.

FIG. 4 is a flow chart of a vehicle control method according to embodiment three of the present application. This embodiment can be based on the above embodiments. In this embodiment, various implementations of the method for calculating a lateral displacement deviation of the controlled vehicle according to the front lane line information, the front guardrail information and the front target vehicle information are provided in this embodiment. The technical solution in this embodiment can be combined with each optional solution in one or more of the embodiments described above. As shown in FIG. 4, the method may include the following operations: S410 to S4120.

In S410, front lane line information and front guardrail information of a controlled vehicle is obtained.

In S420, in response to determining that the front lane line information does not include both-side lane line information, the front target vehicle information is determined.

In S430, whether the front guardrail information is empty is determined.

If the front guardrail information is not empty, S480 is executed. If the front guardrail information is empty, S440 is executed.

In one example, the guardrail information is used to characterize a guardrail, and may include guardrail shape parameters and a valid flag bit. Whether the guardrail information is empty can be determined through the flag bit, if the flag $b_{lt}$ is 0, it is considered that no guardrail exists, and if the flag $b_{lt}$ is 1, it is considered that a guardrail exists.

In this embodiment of the present application, when the front lane line information is determined to not include both-side lane line information, and after the front target vehicle information is determined, it can be determined whether the front guardrail information is not empty. It can be understood that if the front lane line information does not include both-side lane line information and the front guardrail information is empty, determined whether the front lane line information includes one-side lane line information can be determined. If one-side lane line information is determined to be existed in the front lane line information, a lateral displacement deviation of the controlled vehicle is calculated according to the one-side lane line information. If no one-side lane line information is determined to be existed in the front lane line information, a lateral displacement deviation of the controlled vehicle is calculated according to the front target vehicle information. Accordingly, if the front lane line information does not include both-side lane line information, and the front guardrail information is not empty, determined whether the front lane line information includes one-side lane line information can be determined. If one-side lane line information is determined to be existed in the front lane line information, a lateral displacement deviation of the controlled vehicle is calculated according to the front guardrail information and the one-side lane line information. If no one-side lane line information is determined to be existed in the front lane line information, a lateral displacement deviation of the controlled vehicle is calculated according to the front target vehicle information.

In S440, whether the front lane line information includes one-side lane line information is determined.

If the front lane line information includes one-side lane line information, S450 is executed. If the front lane line information does not include one-side lane line information, S470 is executed. The one-side lane line may be the lane line on any side of the current driving lane of the vehicle, for example, a left-side lane line or a right-side lane line.

In this embodiment of the present application, after the front lane line information is determined to not include both-side lane line information, and the front guardrail information is empty, whether the front lane line information includes one-side lane line information can be determined, so that when the front lane line information includes one-side lane line information, a lateral displacement deviation of the controlled vehicle is calculated according to the one-side lane line information; and when the front lane line information is empty, a lateral displacement deviation of the controlled vehicle is calculated according to the front target vehicle information.

In S450, the type of a one-side lane line is determined.

In this embodiment of the present application, after it is determined that the front lane line information does not include both-side lane line information, the front guardrail information is empty and the front lane line information includes one-side lane line information, the type of the one-side lane line can be determined, so that whether the one-side lane line is a left-side lane line or a right-side lane line is determined.

In S460, a lateral displacement deviation of the controlled vehicle is determined according to the type of the one-side lane line.

In this embodiment of the present application, after the type of the one-side lane line is determined, a lateral displacement deviation of the controlled vehicle can be determined according to the type of the one-side lane line, thereby achieving lateral control of the vehicle according to the one-side lane line information.

In an embodiment, the determining a lateral displacement deviation of the controlled vehicle according to the type of the one-side lane line may include: in a case where the one-side lane line is a left-side lane line, calculating a lateral displacement deviation of the controlled vehicle by using the following formula:

$$d_{lt} = a_{lt} + b_{lt} \cdot (t_p \cdot v) + c_{lt} \cdot (t_p \cdot v)^2 + D_{lt} \cdot (t_p \cdot v)^3 + \frac{W_{lane}}{2};$$

and in a case where the one-side lane line is a right-side lane line, calculating a lateral displacement deviation of the controlled vehicle by using the following formula:

$$d_{rt} = a_{rt} + b_{rt} \cdot (t_p \cdot v) + c_{rt} \cdot (t_p \cdot v)^2 + D_{rt} \cdot (t_p \cdot v)^3 - \frac{W_{lane}}{2}.$$

$d_{lt}$ denotes a lateral displacement deviation of the controlled vehicle calculated according to the left-side lane line information, $t_p$ denotes a preview time, and v denotes a travelling speed of the controlled vehicle.

For example, a cubic polynomial used to represent the left-side lane line can be determined according to geographical location information of the left-side lane line, $a_{lt}$ denotes the intercept of a current position of the controlled vehicle calculated according to the left-side lane line information (for example, this intercept can be a lateral distance between the current center of a front guard of the vehicle and the left-side lane line), that is, a constant term in the polynomial representing the left-side lane line, and $b_{lt}$ denotes the slope of the current position of the controlled vehicle, of the left-side lane line calculated according to the left-side lane line information, that is, a linear term coefficient in the polynomial representing the left-side lane line, $c_{lt}$ denotes the curvature of the current position of the controlled vehicle, of the left-side lane line calculated according to the left-side lane line information, that is, a quadratic term coefficient in the polynomial representing the left-side lane line, and $D_{lt}$ denotes the change rate of the curvature of the left-side lane line calculated according to the left-side lane line information, that is, a cubic term coefficient in the polynomial representing the left-side lane line, and $W_{lane}$ denotes a default width of the lane line.

$d_{rt}$ denotes a lateral displacement deviation of the controlled vehicle calculated according to the right-side lane line information, for example, a cubic polynomial used to represent the right-side lane line can be determined according to geographical location information of the right-side lane line, $a_{rt}$ denotes the intercept of a current position of the controlled vehicle calculated according to the right-side lane line information, that is, a constant term in the polynomial representing the right-side lane line, $b_{rt}$ denotes the slope of the current position of the controlled vehicle, of the right-side lane line calculated according to the right-side lane line information, that is, a linear term coefficient in the polynomial representing the right-side lane line, $c_{rt}$ denotes the curvature of the current position of the controlled vehicle, of the right-side lane line calculated according to the right-side lane line information, that is, a quadratic term coefficient in the polynomial representing the right-side lane line, and $D_{rt}$ denotes the change rate of the curvature of the right-side lane line calculated according to the right-side lane line information, that is, a cubic term coefficient in the polynomial representing the right-side lane line.

In S470, a lateral displacement deviation of the controlled vehicle is calculated according to the front target vehicle information.

In this embodiment of the present application, in a case where the front lane line information is determined to be empty and the front guardrail information is determined to be empty, a lateral displacement deviation of the controlled vehicle can be calculated according to the front target vehicle information, thereby realizing the lateral control of the controlled vehicle according to the front target vehicle information.

In an embodiment, the calculating a lateral displacement deviation of the controlled vehicle according to the front target vehicle information may include as follow. In a case where a front target vehicle is determined to be existed, a vehicle longitudinal distance between the controlled vehicle and the front target vehicle can be determined. The vehicle longitudinal distance may be a longitudinal distance between the controlled vehicle and the front target vehicle, for example, it can be the distance between the center points of the two vehicles, or it can be the distance between the front of the controlled vehicle and the rear of the front target vehicle, and there are many ways to determine the vehicle longitudinal distance. When the vehicle longitudinal distance is determined to be less than or equal to a set distance threshold, a lateral displacement deviation of the controlled vehicle is calculated according to the front target vehicle information. The set distance threshold may be a set longitudinal distance threshold between the controlled vehicle and the front target vehicle. It can be understood that if the vehicle longitudinal distance is less than or equal to the set distance threshold, it means that the distance between the front target vehicle and the controlled vehicle is small, and a lateral displacement deviation of the controlled vehicle can be calculated according to the front target vehicle information. If the vehicle longitudinal distance is greater than the set distance threshold, it means that the distance between the front target vehicle and the controlled vehicle is large, and the error in calculating a lateral displacement deviation according to the front target vehicle information will be large, and a lateral displacement deviation of the controlled vehicle cannot be calculated according to the front target vehicle information.

In an embodiment, the vehicle control method may further include as follows. In a case where front guardrail information and front target vehicle information is determined to be not existed or in a case where the vehicle longitudinal distance is determined to be greater than a set distance threshold, it means that the controlled vehicle has no referenceable influence factors to be used to calculate the lateral displacement deviation, or the front target vehicle has no reference value. In this case, current vehicle status information of the controlled vehicle can be obtained, and the controlled vehicle can be controlled according to the current vehicle status information to travel. In an embodiment, the controlling the controlled vehicle according to the current vehicle status information to travel may include: maintaining a current travelling status of the controlled vehicle according to the current vehicle status information, and obtaining a current vehicle status maintenance time; where the current vehicle status maintenance time is the duration to maintain the current travelling status of the controlled vehicle; the current vehicle status maintenance time may be the duration to maintain the current travelling status of the controlled vehicle. When the current vehicle status maintenance time is determined to be less than the set time threshold, and the controlled vehicle obtains none of front lane line information, front guardrail information and front target vehicle information in the process of maintaining the current travelling status, it indicates that the controlled vehicle cannot obtain referenceable influencing factors to calculate a lateral displacement deviation, then it returns to perform the step of maintaining the current travelling status of the controlled vehicle according to the current vehicle status information until the current vehicle status maintenance time is determined to be equal to a set time threshold, and then it may exit the lane keeping system. The set time threshold may be a set duration threshold for maintaining the current travelling status of the controlled vehicle. When the current vehicle status maintenance time is determined to be less than the set time threshold, and the controlled vehicle obtains at least one of front lane line information, front guardrail information and front target vehicle information in the process of maintaining the current travelling status, it indicates that the controlled vehicle has obtained a referenceable influencing factor to calculate the lateral displacement deviation, then it returns to perform the operation of determining a lateral displacement deviation of the controlled vehicle according to at least one of the front lane line information and the front guardrail information, or it returns to perform the operation of calculating a lateral displacement deviation of the controlled vehicle according to the front target vehicle information, that is, it can recalculate a lateral displacement deviation according to the type of the influencing factors. For example, if the controlled vehicle obtains front lane line information and/or front guardrail information while maintaining the current travelling status, it can return to perform the operation of determining a lateral displacement deviation of the controlled vehicle according to at least one of the front lane line information and the front guardrail information. If the controlled vehicle only obtains available front target vehicle information while maintaining the current travelling status, it can return to perform the operation of calculating a lateral displacement deviation of the controlled vehicle according to the front target vehicle information.

In S480, whether the front lane line information includes one-side lane line information is determined.

If the front lane line information includes one-side lane line information, S490 is executed. If the front lane line information does not include one-side lane line information, S4100 is executed.

In an embodiment of the present application, in a case where that the front lane line information is determined to not include both-side lane line information and the front guardrail information is determined to be not empty, whether the front lane line information includes one-side lane line information may be determined. It can be understood that if the front lane line information includes one-side lane line information, a lateral displacement deviation of the controlled vehicle can be calculated according to the front guardrail information and the one-side lane line information. If the front lane line information is empty, a lateral displacement deviation of the controlled vehicle can be calculated according to the front target vehicle information.

In S490, a lateral displacement deviation of the controlled vehicle is calculated according to the front guardrail information and the one-side lane line information.

In an embodiment of the present application, after in a case where that the front lane line information is determined to not include both-side lane line information, the front guardrail information is determined to be not empty and the front lane line information includes one-side lane line information, a lateral displacement deviation of the controlled vehicle can be calculated according to the front guardrail information and the one-side lane line information.

For example, the calculating a lateral displacement deviation of the controlled vehicle according to the front guardrail information and the one-side lane line information may include: calculating a lateral displacement deviation of the controlled vehicle according to the front guardrail information and the one-side lane line information by using the following formula:

$$d_{fix2} = W_1 \cdot d_{yt} + W_2 \cdot d_{rdg}$$

$$W_1 + W_2 = 1$$

where, $d_{fix2}$ denotes a lateral displacement deviation of the controlled vehicle calculated according to the front guardrail information and the one-side lane line information, $d_{yt}$ denotes a lateral displacement deviation of the controlled vehicle corresponding to the one-side lane line information, and $d_{yt}$ is $d_{lt}$ or $d_{rt}$, $W_1$ denotes a one-side lane line weight, and $W_2$ denotes a second guardrail weight coefficient.

In S4100, a lateral displacement deviation of the controlled vehicle is calculated according to the front target vehicle information.

In an embodiment of the present application, in a case where the front lane line information is determined to be empty and the front guardrail information is determined to be not empty, a lateral displacement deviation of the controlled vehicle is calculated according to the front target vehicle information, thereby realizing the lateral control of the controlled vehicle according to the front target vehicle information.

For example, the calculating a lateral displacement deviation of the controlled vehicle according to the front target vehicle information may include: in response to determining that the front target vehicle information is not empty (for example, there is a front target vehicle in the front target vehicle information), determining a vehicle longitudinal distance between the controlled vehicle and the front target vehicle; in response to determining that the vehicle longitudinal distance is smaller than or equal to a set distance threshold, calculating a lateral displacement deviation of the controlled vehicle according to the front target vehicle information; in response to determining that no front target vehicle exists or the vehicle longitudinal distance is greater than the set distance threshold, calculating a lateral displacement deviation of the controlled vehicle according to the front guardrail information. It can be understood that if the vehicle longitudinal distance is less than or equal to the set distance threshold, it means that the distance between the front target vehicle and the controlled vehicle is small, thus, a lateral displacement deviation of the controlled vehicle can be calculated according to the front target vehicle information. If the vehicle longitudinal distance is greater than the set distance threshold, it means that the distance between the front target vehicle and the controlled vehicle is large, thus, a lateral displacement deviation of the controlled vehicle cannot be calculated according to the front target vehicle information.

For example, the calculating a lateral displacement deviation of the controlled vehicle according to the front target vehicle information may include: calculating a lateral displacement deviation of the controlled vehicle according to the front target vehicle information by using the following formula:

$$d_{obj} = \arctan\frac{y_{obj}}{x_{obj}} \cdot \min(x_{obj}, t_p \cdot v)$$

where, $d_{obj}$ denotes a lateral displacement deviation of the controlled vehicle calculated according to the front target vehicle information, $x_{obj}$ denotes the longitudinal distance between the controlled vehicle and the front target vehicle, and $y_{obj}$ denotes a lateral distance between the controlled vehicle and the front target vehicle. The front target vehicle information includes $x_{obj}$ and $y_{obj}$, etc.

Figure 5:
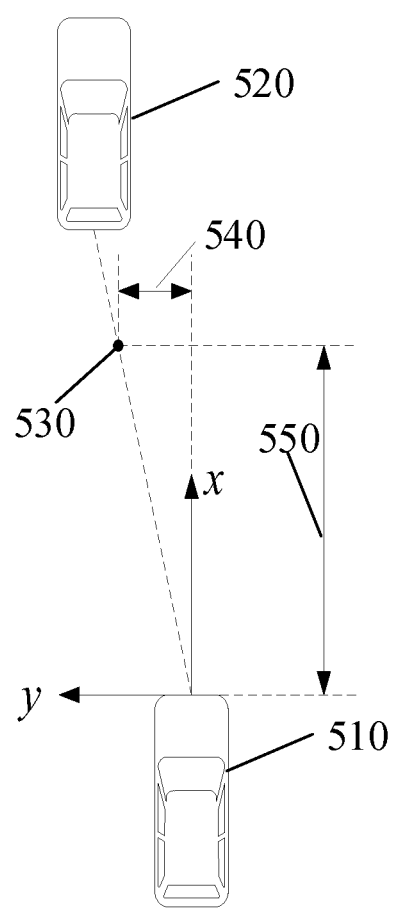
FIG. 5 is a schematic diagram for calculating lateral displacement deviation according to the embodiment three of the present application.

FIG. 5 is a schematic diagram for calculating a lateral displacement deviation according to the embodiment three of the present application. As shown in FIG. 5, a lateral displacement deviation 540 is calculated according to a preset longitudinal distance 550 between a front target vehicle 520 and a controlled vehicle 510, specifically, the lateral displacement deviation 540 is a lateral distance between a current position of the controlled vehicle 510 and a preview position 530 of the controlled vehicle 510, and x and y respectively represent different coordinate system axes.

In an embodiment, the calculating a lateral displacement deviation of the controlled vehicle according to the front guardrail information may include: calculating a lateral displacement deviation of the controlled vehicle according to the front guardrail information by using the following formula:

$$d_{rdg} = a_{rdg} + b_{rdg} \cdot (t_p \cdot v) + c_{rdg} \cdot (t_p \cdot v)^2 + W_{rdg}$$

where, $W_{rdg}$ denotes a road deviation calculated according to a front guardrail. The value of $W_{rdg}$ can be updated in real time. When the front lane line information is unavailable, the value at a last moment before the front lane line information becomes unavailable is used as a control deviation, so as to improve smoothness of control during data source switch.

In S4110, an expected steering angle of the controlled vehicle is calculated according to the lateral displacement deviation.

In S4120, the controlled vehicle is controlled according to the expected steering angle to travel.

In the above embodiment, when the lane line quality is low, available sensing results are mostly used, the available sensing results include the guardrails, the front target vehicle, etc., and also the expected trajectory is smoothed, thereby improving the stability and smoothness of the lane keeping system.

In this embodiment, the front lane line information and the front guardrail information of the controlled vehicle is obtained, and when it is determined that the front lane line information does not include both-side lane line information, the front target vehicle information is determined; when the front guardrail information is empty, and if the front lane line information includes one-side lane line information, a lateral displacement deviation of the controlled vehicle is determined according to the type of the one-side lane line; if the front lane line information is empty, a lateral displacement deviation of the controlled vehicle is calculated according to the front target vehicle information; when the front guardrail information is not empty, and if the front lane line information includes one-side lane line information, a lateral displacement deviation of the controlled vehicle is calculated according to the front guardrail information and the one-side lane line information; if the front lane line information is empty, then a lateral displacement deviation of the controlled vehicle is calculated according to the front target vehicle information; an expected steering angle of the controlled vehicle is calculated according to the lateral displacement deviation, and the controlled vehicle is controlled according to the expected steering angle to travel, In such way, the vehicle control method can cope with the conditions of low accuracy and poor control effect in performing lateral control to the vehicle according to only the single lane line information, and can calculate the lateral displacement deviation of the vehicle according to multi-dimensional influencing factors, making the lateral displacement deviation more accurate and precise, thereby improving the accuracy of vehicle control and improving the control effect of vehicle control.

Embodiment Four

Figure 6:
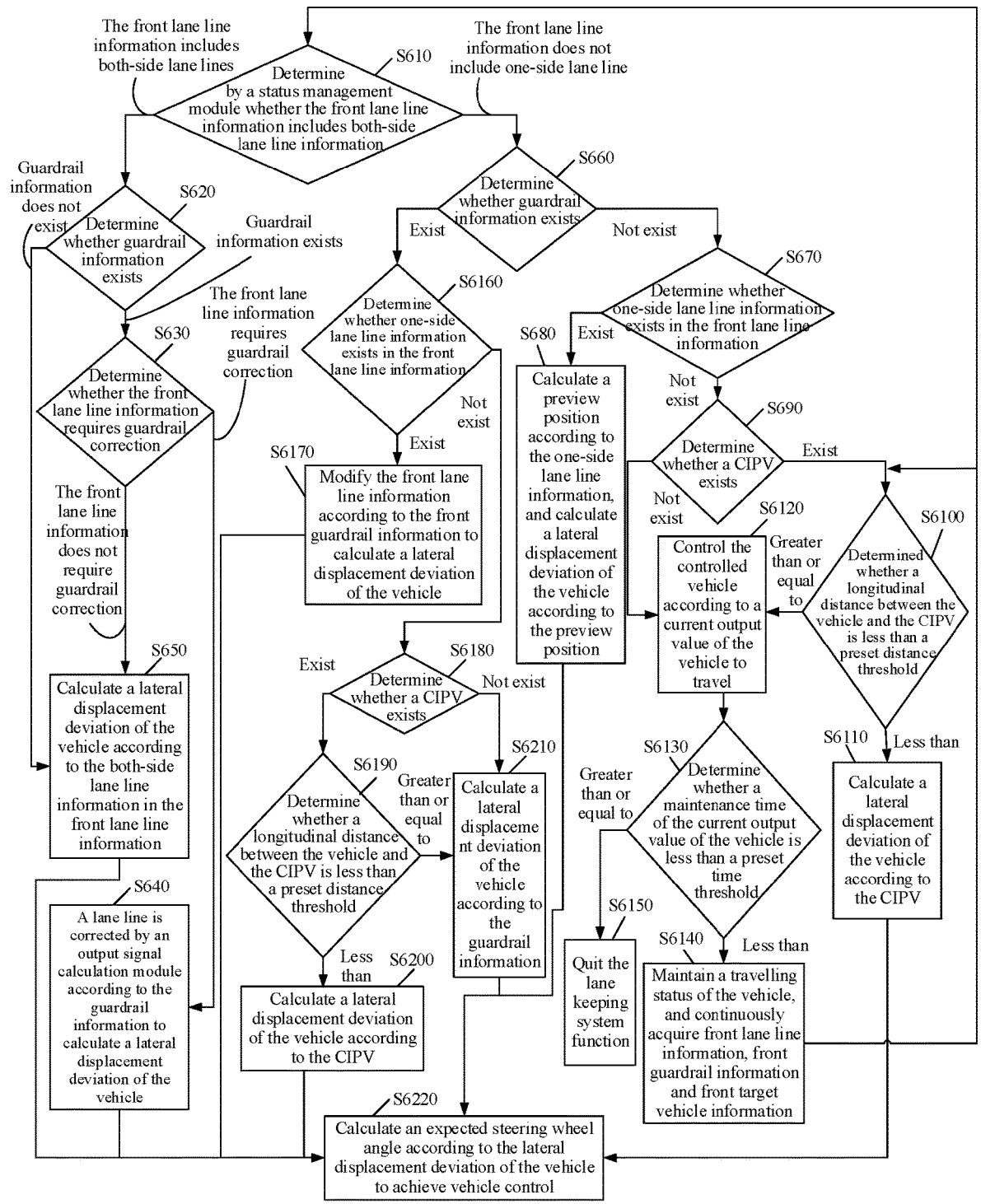
FIG. 6 is a flow chart of a vehicle control method according to embodiment four of the present application.

FIG. 6 is a flow chart of a vehicle control method according to embodiment four of the present application. As shown in FIG. 6, the method includes the following operations: S610 to S6220.

In S610, whether the front lane line information includes both-side lane line information is determined by a status management module.

If the front lane line information includes both-side lane line information, S620 is executed. If the front lane line information does not include both-side lane line information, S660 is executed.

In S620, whether guardrail information is exists is determined. If the guardrail information exists, S630 is executed. If guardrail information does not exist, S650 is executed.

In S630, whether the front lane line information requires guardrail correction is determined. If the front lane line information requires guardrail correction, S640 is executed. If the front lane line information does not require guardrail correction, S650 is executed.

In S640, a lane line is corrected by an output signal calculation module according to the guardrail information to calculate a lateral displacement deviation of the vehicle.

In S650, a lateral displacement deviation of the vehicle is calculated according to the both-side lane line information in the front lane line information.

In S660, whether guardrail information exists is determined. If no guardrail information exists, S670 is executed. If guardrail information exists, S6160 is executed.

In S670, whether one-side lane line information exists in the front lane line information is determined. If one-side lane line information exists in the front lane line information, S680 is executed. If no one-side lane line information exists in the front lane line information, S690 is executed.

In S680, a preview position is calculated according to the one-side lane line information, and a lateral displacement deviation of the vehicle is calculated according to the preview position.

In S690, whether a closest in path vehicle (CIPV, a front following target, that is, a front target vehicle) exists is determined. If CIPV exists, S6100 is executed; if CIPV does not exist, S6120 is executed.

In S6100, whether a longitudinal distance between the vehicle and the CIPV is less than a preset distance threshold is determined. If the longitudinal distance between the vehicle and the CIPV is less than the preset distance threshold, S6110 is executed. If the longitudinal distance between the vehicle and the CIPV is greater than or equal to the preset distance threshold, S6120 is executed.

In S6110, a lateral displacement deviation of the vehicle is calculated according to the CIPV.

In S6120, the controlled vehicle is controlled according to a current output value of the vehicle to travel.

In S6130, whether a maintenance time of a current output value of the vehicle is less than a preset time threshold is determined. If the maintenance time of the current output value of the vehicle is less than the preset time threshold, S6140 is executed. If the maintenance time of the current output value of the vehicle is longer than or equal to the preset time threshold, S6150 is executed.

In S6140, a travelling status of the vehicle is maintained, and the front lane line information, the front guardrail information and the front target vehicle information is continuously acquired.

In a case where it is determined that at least one of front lane line information, front guardrail information and front target vehicle information is obtained, it returns to execute S610 or S6100.

Accordingly, if none of the front lane line information, the front guardrail information, and the front target vehicle information is obtained while the vehicle is maintaining the vehicle's travelling status, the vehicle's travelling status will continue to be maintained, and when the maintenance time of the current output value of the vehicle is equal to the preset time threshold, the lane keeping system quits.

In S6150, the lane keeping system function quits.

In S6160, whether one-side lane line information exists in the front lane line information is determined. If one-side lane line information exists in the front lane line information, S6170 is executed. If no one-side lane line information exists in the front lane line information, S6180 is executed.

In S6170, the front lane line information is modified according to the front guardrail information to calculate the lateral displacement deviation of the vehicle.

In S6180, whether a CIPV exists is determined. If CIPV exists, S6190 is executed; if CIPV does not exist, S6210 is executed.

In S6190, in a case where whether a longitudinal distance between the vehicle and the CIPV is less than a preset distance threshold.

If the longitudinal distance between the vehicle and the CIPV is less than the preset distance threshold, S6200 is executed. If the longitudinal distance between the vehicle and the CIPV is greater than or equal to the preset distance threshold, S6210 is executed.

In S6200, a lateral displacement deviation of the vehicle is calculated according to the CIPV.

In S6210, a lateral displacement deviation of the vehicle is calculated according to the guardrail information.

In S6220, an expected steering wheel angle is calculated according to the lateral displacement deviation of the vehicle to achieve vehicle control.

Figure 7:
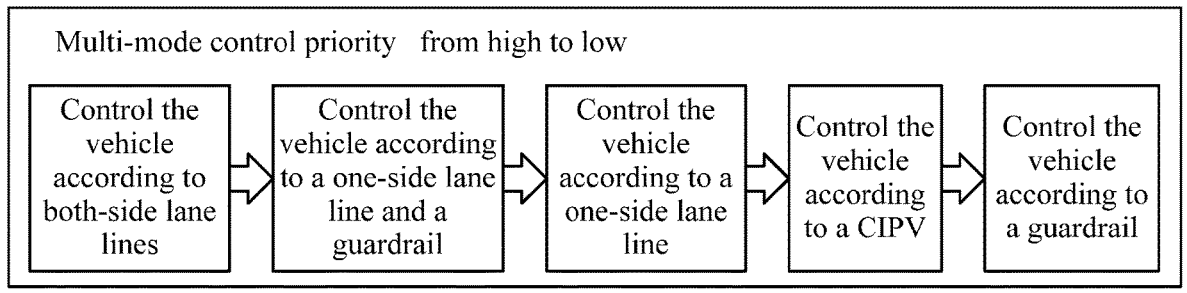
FIG. 7 is a schematic diagram of a multi-mode control priority of a vehicle control method according to the embodiment four of the present application.

FIG. 7 is a schematic diagram of a multi-mode control priority of a vehicle control method according to the embodiment four of the present application. In this embodiment, as shown in FIG. 7, the priority of controlling the vehicle according to both-side lane lines is greater than the priority of controlling the vehicle according to a one-side lane line and a guardrail. The priority of controlling the vehicle according to a one-side lane line and a guardrail is greater than the priority of controlling the vehicle according to a one-side lane line. The priority of controlling the vehicle according to a one-side lane line is greater than the priority of controlling the vehicle according to a CIPV. The priority of controlling the vehicle according to a CIPV is greater than the priority of controlling the vehicle according to a guardrail.

This embodiment reduces the calculation overhead of the lane keeping system and reduces the requirements for the software platform; moreover, the lane keeping system uses multiple data sources as the basis for lateral control, performs mutual verification on the lateral control data sources, and improves the fault tolerance of the lane keeping system, reduces dependence on a single data source and improves the availability of the lane keeping system.

Embodiment Five

Figure 8:
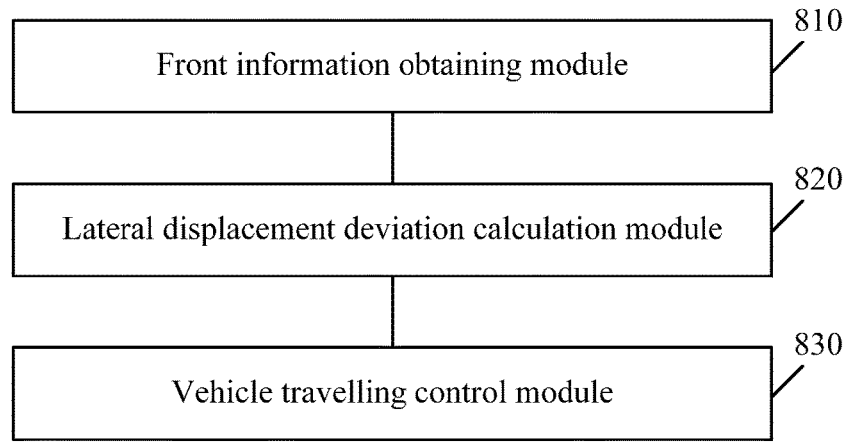
FIG. 8 is a schematic diagram of a vehicle control apparatus according to embodiment five of the present application.

FIG. 8 is a schematic diagram of a vehicle control apparatus according to embodiment five of the present application. As shown in FIG. 8, the apparatus includes: a front information obtaining module 810, a lateral displacement deviation calculation module 820 and a vehicle travelling control module 830.

The front information obtaining module 810 is configured to obtain front lane line information and front guardrail information of a controlled vehicle.

The lateral displacement deviation calculation module 820 is configured to determine a lateral displacement deviation of the controlled vehicle according to at least one of the front lane line information and the front guardrail information. Specifically, the lateral displacement deviation is a lateral distance between a current position of the controlled vehicle and a preview position of the controlled vehicle.

The vehicle travelling control module 830 is configured to control the controlled vehicle according to the lateral displacement deviation to travel.

In an embodiment, the lateral displacement deviation calculation module 820 may be configured to: in response to determining that the front lane line information includes both-side lane line information, the front guardrail information includes a front guardrail, and the front lane line information is determined to require guardrail correction according to a first guardrail correction condition, calculate a lateral displacement deviation of the controlled vehicle according to the front guardrail information and the front lane line information; and in response to determining that the front lane line information includes both-side lane line information, the front guardrail information includes a front guardrail, and the front lane line information is determined to not require guardrail correction according to a second guardrail correction condition, calculate a lateral displacement deviation of the controlled vehicle according to the front lane line information.

In an embodiment, the lateral displacement deviation calculation module 820 can be configured to calculate a lateral displacement deviation of the controlled vehicle by using the following formula:

$$d_{fix1} = \begin{cases} F_{lane} \cdot d_{ct} + F_{rdg} \cdot d_{rdg} & d_{ct} < a_{rdg} + b_{rdg} \cdot D + c_{rdg} \cdot D^2 \\ d_{ct} & d_{ct} \geq a_{rdg} + b_{rdg} \cdot D + c_{rdg} \cdot D^2 \end{cases};$$

$$d_{ct} = a_{ct} + b_{ct} \cdot b_{lt} \cdot (t_p \cdot v) + c_{ct} \cdot (t_p \cdot v)^2 + d_{ct} \cdot (t_p \cdot v)^3$$

where, $d_{fix1}$ denotes a lateral displacement deviation of the controlled vehicle calculated according to the front guardrail information and the front lane line information, or according to only the front lane line information. $F_{lane}$ denotes a lane line weight coefficient, $F_{rdg}$ denotes a first guardrail weight coefficient, $d_{ct}$ denotes a lateral displacement deviation of the controlled vehicle calculated according to a lane centerline, $d_{rdg}$ denotes a lateral displacement deviation of the controlled vehicle calculated according to front guardrail-associated parameters, and $a_{rdg}$, $b_{rdg}$ and $c_{rdg}$ are the front guardrail-associated parameters. $a_{rdg}$ denotes the intercept of a current position of the controlled vehicle calculated according to the front guardrail information, $b_{rdg}$ denotes the slope of a position, corresponding to the current position of the controlled vehicle, of the guardrail calculated according to the front guardrail information, $c_{rdg}$ denotes the curvature of a position, corresponding to the current position of the controlled vehicle, of the guardrail calculated according to the front guardrail information, and D denotes a calibration parameter of the detection distance of the controlled vehicle; $d_{ct} < a_{rdg} + b_{rdg} \cdot D + c_{rdg} \cdot D^2$ denotes the first guardrail correction condition; $d_{ct} \geq a_{rdg} + b_{rdg} \cdot D + c_{rdg} \cdot D^2$ denotes the second guardrail correction condition. $a_{ct}$ denotes the intercept of the current position of the controlled vehicle calculated according to the position of the lane centerline, $b_{ct}$ denotes the slope of a position, corresponding to the current position of the controlled vehicle, of the lane centerline calculated according to the position of the lane centerline, $c_{ct}$ denotes the curvature of a position, corresponding to the current position of the controlled vehicle, of the lane centerline calculated according to the position of the lane centerline, $b_{lt}$ denotes the slope of a position, corresponding to the current position of the controlled vehicle, of the left lane line calculated according to the position of the left lane line, $t_p$ denotes a preview time, v denotes a travelling speed of the controlled vehicle.

In an embodiment, the lateral displacement deviation calculation module 820 may further be configured to: in response to determining that the front lane line information does not include both-side lane line information, determine front target vehicle information; and determine a lateral displacement deviation of the controlled vehicle according to at least one of the front guardrail information and the front target vehicle information.

In an embodiment, the lateral displacement deviation calculation module 820 may further be configured to: in response to determining that the front guardrail information is empty and in a case where the front lane line information includes one-side lane line information, determine the type of a one-side lane line; and determine a lateral displacement deviation of the controlled vehicle according to the type of the one-side lane line.

In an embodiment, the lateral displacement deviation calculation module 820 may further be configured to: in response to determining that the one-side lane line is the left-side lane line, calculate a lateral displacement deviation of the controlled vehicle by using the following formula:

$$d_{lt} = a_{lt} + b_{lt} \cdot (t_p \cdot v) + c_{lt} \cdot (t_p \cdot v)^2 + D_{lt} \cdot (t_p \cdot v)^3 + \frac{W_{lane}}{2};$$

and in response to determining that the one-side lane line is the right-side lane line, calculate a lateral displacement deviation of the controlled vehicle by using the following formula:

$$d_{rt} = a_{rt} + b_{rt} \cdot (t_p \cdot v) + c_{rt} \cdot (t_p \cdot v)^2 + D_{rt} \cdot (t_p \cdot v)^3 - \frac{W_{lane}}{2}.$$

Where $d_{lt}$ denotes a lateral displacement deviation of the controlled vehicle calculated according to the left-side lane line information. $a_{lt}$ denotes the intercept of a current position of the controlled vehicle calculated according to the left-side lane line information, and $b_{lt}$ denotes the slope of the current position of the controlled vehicle, of the left-side lane line calculated according to the left-side lane line information, $c_{lt}$ denotes the curvature of the current position of the controlled vehicle, of the left-side lane line calculated according to the left-side lane line information, $D_{lt}$ denotes the change rate of the curvature of the left-side lane line calculated according to the left-side lane line information, and $W_{lane}$ denotes a default lane line width. $t_p$ denotes a preview time, and v denotes a travelling speed of the controlled vehicle. $d_{rt}$ denotes a lateral displacement deviation of the controlled vehicle calculated according to the right-side lane line information, $a_{rt}$ denotes the intercept of the current position of the controlled vehicle calculated according to the right-side lane line information, and $b_{rt}$ denotes the slope of the current position of the controlled vehicle, of the right-side lane line calculated according to the right-side lane line information, $c_{rt}$ denotes the curvature of the current position of the controlled vehicle, of the right-side lane line calculated according to the right-side lane line information, and $D_{rt}$ denotes the change rate of the curvature of the right-side lane line calculated according to the right-side lane line information.

In an embodiment, the lateral displacement deviation calculation module 820 may further be configured to: in response to determining that the front guardrail information is empty and the front lane line information does not include one-side lane line information, calculate a lateral displacement deviation of the controlled vehicle according to the front target vehicle information. In an embodiment, the lateral displacement deviation calculation module 820 may further be configured to: in response to determining that a front target vehicle exists, determine a vehicle longitudinal distance between the controlled vehicle and the front target vehicle; and in response to determining that the vehicle longitudinal distance is less than or equal to a set distance threshold, calculate a lateral displacement deviation of the controlled vehicle according to the front target vehicle information.

In an embodiment, the lateral displacement deviation calculation module 820 may further be configured to: in response to determining that the front guardrail information and the front target vehicle information do not exist, or determining that the vehicle longitudinal distance is greater than the set distance threshold, obtain current vehicle status information of the controlled vehicle; and according to the current vehicle status information, control the controlled vehicle to travel according to the current vehicle status information.

In an embodiment, the lateral displacement deviation calculation module 820 may further be configured to: maintain a current travelling status of the controlled vehicle according to the current vehicle status information; obtain a current vehicle status maintenance time, where the current vehicle status maintenance time is a duration of maintaining the current travelling status of the controlled vehicle; in response to determining that the current vehicle status maintenance time is less than a set time threshold, and in a case where the controlled vehicle obtains none of front lane line information, front guardrail information, and front target vehicle information in the process of maintaining the current travelling status, return to perform the operation of maintaining the current travelling status of the controlled vehicle according to the current vehicle status information until a current vehicle status maintenance time is determined to be equal to the set time threshold; and in response to determining that the current vehicle status maintenance time is less than a set time threshold, and in a case where the controlled vehicle obtains at least one of front lane line information, front guardrail information and front target vehicle information in the process of maintaining the current travelling status, return to perform the operation of determining a lateral displacement deviation of the controlled vehicle according to at least one of the front lane line information and the front guardrail information, or return to perform the operation of calculating a lateral displacement deviation of the controlled vehicle according to the front target vehicle information.

In an embodiment, the lateral displacement deviation calculation module 820 may further be configured to: in response to determining that the front guardrail information is not empty and the front lane line information includes one-side lane line information, calculate a lateral displacement deviation of the controlled vehicle according to the front guardrail information and the one-side lane line information In an embodiment, the lateral displacement deviation calculation module 820 may further be configured to calculate a lateral displacement deviation of the controlled vehicle according to the front guardrail information and the one-side lane line information by using the following formula:

$$d_{fix2} = W_1 \cdot d_{yt} + W_2 \cdot d_{rdg};$$
$$W_1 + W_2 = 1.$$

where, $d_{fix2}$ denotes a lateral displacement deviation of the controlled vehicle calculated according to the front guardrail information and the one-side lane line information, $d_{yt}$ denotes a lateral displacement deviation of the controlled vehicle corresponding to the one-side lane line information, and $d_{yt}$ is $d_{lt}$ or $d_{rt}$, $W_1$ denotes a one-side lane line weight, and $W_2$ denotes a second guardrail weight coefficient.

In an embodiment, the lateral displacement deviation calculation module 820 may further be configured to: in response to determining that the front guardrail information is not empty and the front lane line information does not include one-side lane line information, calculate a lateral displacement deviation of the controlled vehicle according to the front target vehicle information. In an embodiment, the lateral displacement deviation calculation module 820 may further be configured to: in response to determining that the front target vehicle information is not empty, determine a vehicle longitudinal distance between the controlled vehicle and the front target vehicle; in response to determining that the vehicle longitudinal distance is less than or equal to a set distance threshold, calculate a lateral displacement deviation of the controlled vehicle according to the front target vehicle information; and in response to determining that no front target vehicle exists or that the vehicle longitudinal distance is greater than the set distance threshold, calculate a lateral displacement deviation of the controlled vehicle according to the front guardrail information.

In an embodiment, the lateral displacement deviation calculation module 820 may further be configured to: calculate a lateral displacement deviation of the controlled vehicle according to the front target vehicle information by using the following formula:

$$d_{obj} = \arctan \frac{y_{obj}}{x_{obj}} \cdot \min(x_{obj}, t_p \cdot v).$$

where, $d_{obj}$ denotes a lateral displacement deviation of the controlled vehicle calculated according to the front target vehicle information, $x_{obj}$ denotes the longitudinal distance between the controlled vehicle and the front target vehicle, and $y_{obj}$ denotes a lateral distance between the controlled vehicle and the front target vehicle.

In an embodiment, the lateral displacement deviation calculation module 820 may further be configured to calculate a lateral displacement deviation of the controlled vehicle according to the front guardrail information by using the following formula:

$$d_{rdg} = a_{rdg} + b_{rdg} \cdot (t_p \cdot v) + c_{rdg} \cdot (t_p \cdot v)^2 + W_{rdg}.$$

Where $W_{rdg}$ denotes a road deviation calculated according to a front guardrail.

In an embodiment, the front information obtaining module 810 may be configured to determine a front guardrail in the front guardrail information based on the following manner: in response to determining that the front guardrail information includes one-side front guardrail, and in a case where a distance between the one-side front guardrail and the controlled vehicle is less than a half width of the single lane, determine that the one-side front guardrail is the front guardrail; in response to determining that the front guardrail information includes both-side front guardrails, and in a case where a distance between a target-side front guardrail in the both-side front guardrails and the controlled vehicle is less than the half width of the single lane, determine that the target-side front guardrail is the front guardrail; and in response to determining that the front guardrail information includes both-side front guardrails, and in a case where distances between the controlled vehicle and the both-side front guardrails are each less than the half width of the single lane, determine that a one-side front guardrail in the both-side front guardrail is the front guardrail.

In an embodiment, the vehicle travelling control module 830 may be configured to: calculate an expected steering angle of the controlled vehicle according to the lateral displacement deviation; and control the controlled vehicle according to the expected steering angle to travel.

In an embodiment, the vehicle travelling control module 830 may further be configured to calculate the expected steering angle of the controlled vehicle according to the lateral displacement deviation by using the following formula:

$$\delta_f = \arctan\left(\frac{2 \cdot L \cdot d_{design}}{(v \cdot t_p)^2}\right)$$

where, δf denotes the front wheel steering angle of the controlled vehicle, L denotes a wheelbase of the controlled vehicle, and $d_{design}$ denotes the lateral displacement deviation.

In this embodiment, the front lane line information and the front guardrail information of the controlled vehicle is obtained, and according to at least one of the front lane line information and the front guardrail information, the lateral distance between the current position of the controlled vehicle and the preview position of the controlled vehicle is determined as the lateral displacement deviation of the controlled vehicle to control the controlled vehicle according to the lateral displacement deviation to travel, which can cope with the conditions of low accuracy and poor control effect in performing lateral control to the vehicle according to only the single lane line information, and can calculate the lateral displacement deviation of the vehicle according to multi-dimensional influencing factors, making the lateral displacement deviation more accurate and precise, thereby improving the accuracy of vehicle control and improving the control effect of vehicle control.

The vehicle control apparatus described above can execute the vehicle control method according to any embodiment of the present application, and has corresponding functional modules for executing the method and beneficial effects achieved by executing the method. For technical details not described in this embodiment, reference may be made to the vehicle control method according to any embodiment of the present application.

In an embodiment, the vehicle control apparatus is installed on the controlled vehicle.

The vehicle control apparatus introduced above is an apparatus that can execute the vehicle control method in the embodiments of the present application. Therefore, based on the vehicle control method introduced in the embodiments of the present application, the person skilled in the $a_{rt}$ can understand specific implementations and variations of the vehicle control apparatus according to this embodiment.

Embodiment Six

Figure 9:
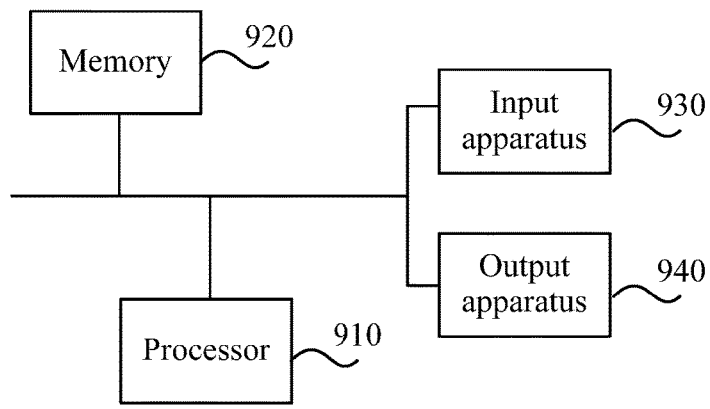
FIG. 9 is a schematic structural diagram of an electronic device according to embodiment six of the present application.

FIG. 9 is a schematic structural diagram of an electronic device according to embodiment six of the present application. As shown in FIG. 9, the electronic device includes a processor 910, a memory (storage apparatus) 920, an input apparatus 930, and an output apparatus 940. The number of processors 910 in the electronic device may be at least one. In FIG. 9, it is taken as an example that one processor 910 is used. The processor 910, the memory 920, the input apparatus 930 and the output apparatus 940 in the electronic device can be connected through a bus or other means. In FIG. 9, the connection through the bus is taken as an example.

As a computer-readable storage medium, the memory 920 can be configured to store software programs, computer-executable programs and modules, such as program instructions/modules corresponding to the vehicle control method in the embodiments of the present application (for example, the front information obtaining module 810, the lateral displacement deviation calculation module 820 and the vehicle travelling control module 830 in the vehicle control apparatus). The processor 910 executes the software programs, instructions and modules stored in the memory 920, to thereby executing various functional applications and data processing of the electronic device, that is, to implement the above vehicle control method: obtaining front lane line information and front guardrail information of a controlled vehicle; determining a lateral displacement deviation of the controlled vehicle according to at least one of the front lane line information and the front guardrail information, where the lateral displacement deviation is a lateral distance between a current position of the controlled vehicle and a preview position of the controlled vehicle; and controlling the controlled vehicle to travel according to the lateral displacement deviation.

The memory 920 may mainly include a program storage area and a data storage area, where the program storage area may store an operating system and an application program required for at least one function. The storage data area may store data created according to the use of the terminal, and the like. In addition, memory 920 may include high-speed random access memory, and may further include non-volatile memory, such as at least one magnetic disk storage device, flash memory device, or other non-volatile solid-state storage device. In some examples, the memory 920 may include a memory located remotely relative to processor 910, and these remote memories may be connected to the electronic device through a network. Examples of the above-mentioned networks include the internet, intranets, local area networks, mobile communication networks and combinations thereof.

The input apparatus 930 may be configured to receive input numeric information or character information, and generate key signal input related to user settings and function control of the electronic device. The output apparatus 940 may include a display device such as a display screen.

Embodiment Seven

A computer storage medium that stores a computer program is further provided according to an embodiment of the present application, the computer program, when being executed by a processor, implements the vehicle control method according to any one of the embodiments of the present application: obtaining front lane line information and front guardrail information of a controlled vehicle; determining a lateral displacement deviation of the controlled vehicle according to at least one of the front lane line information and the front guardrail information, where the lateral displacement deviation is a lateral distance between a current position of the controlled vehicle and a preview position of the controlled vehicle; and according to the lateral displacement deviation, controlling the controlled vehicle to travel.

The computer storage medium in the embodiment of the present application may be one or any combination of more computer-readable media. The computer-readable medium may be a computer-readable signal medium or a computer-readable storage medium. The computer-readable storage medium may be, for example, but is not limited to: an electronic, magnetic, optical, electromagnetic, infrared, or semiconductor system, apparatus or device, or any combination thereof. Computer-readable storage media include (non-exhaustive list): electrical connections having one or more conductors, portable computer disks, hard drives, random access memory (RAM), read-only memory (ROM), erasable programmable read only memory (EPROM), flash memory, optical fiber, portable compact disc read-only memory (CD-ROM), optical storage device, magnetic storage device, or any suitable combination of the above. In this document, a computer-readable storage medium may be any tangible medium that contains or stores a program for use by or in connection with an instruction execution system, apparatus, or device. A computer-readable signal medium may include a data signal propagated in baseband or as part of a carrier wave, and the data signal carries computer-readable program code therein. Such propagated data signals may take many forms, including but not limited to: electromagnetic signals, optical signals, or any suitable combination of the above. A computer-readable signal medium may also be any computer-readable medium other than a computer-readable storage medium that can send, propagate, or transmit a program for use by or in connection with an instruction execution system, apparatus, or device. Program codes contained on a computer-readable medium may be transmitted using any appropriate medium, including but not limited to: wireless, wire, optical cable, radio frequency (RF), etc., or any suitable combination of the above. Computer program codes for performing operations of the present application may be written in one or more programming languages, including object-oriented programming languages such as Java, Smalltalk, C++, and conventional procedural programming language, such as the "C" language or similar programming language or combination thereof. The program codes may be executed entirely or partly on the user's computer, as a stand-alone software package, partly on the user's computer and partly on a remote computer or entirely on the remote computer or server. In the situations involving remote computers, the remote computer can be connected to the user's computer through any kind of network, including a local area network (LAN) or a wide area network (WAN), or it can be connected to an external computer (for example, an Internet service provider is utilized to connect through the Internet).

What is claimed is:

1. A vehicle control method, comprising:
obtaining front lane line information and front guardrail information of a controlled vehicle;
determining a lateral displacement deviation of the controlled vehicle according to at least one of the front lane line information and the front guardrail information, wherein the lateral displacement deviation is a lateral distance between a current position of the controlled vehicle and a preview position of the controlled vehicle; and
controlling the controlled vehicle to travel according to the lateral displacement deviation;
wherein the determining a lateral displacement deviation of the controlled vehicle according to at least one of the front lane line information and the front guardrail information comprises:
in response to determining that the front lane line information does not comprise both-side lane line information, determining front target vehicle information; and
determining a lateral displacement deviation of the controlled vehicle according to at least one of the front guardrail information and the front target vehicle information;
wherein the determining a lateral displacement deviation of the controlled vehicle according to at least one of the front guardrail information and the front target vehicle information comprises:
in response to determining that the front guardrail information is not empty and the front lane line information does not comprise one-side lane line information, calculating a lateral displacement deviation of the controlled vehicle according to the front target vehicle information;
wherein the calculating a lateral displacement deviation of the controlled vehicle according to the front target vehicle information comprises:
in response to determining that the front target vehicle information is not empty, determining a vehicle longitudinal distance between the controlled vehicle and the front target vehicle;
in response to determining that the vehicle longitudinal distance is less than or equal to a set distance threshold, calculating a lateral displacement deviation of the controlled vehicle according to the front target vehicle information; and
in response to determining that no front target vehicle exists or the vehicle longitudinal distance is greater than the set distance threshold, calculating a lateral displacement deviation of the controlled vehicle according to the front guardrail information;
wherein the determining a lateral displacement deviation of the controlled vehicle according to at least one of the front lane line information and the front guardrail information comprises:
in response to determining that the front lane line information comprises both-side lane line information and the front guardrail information is not empty, and in a case where the front lane line information is determined according to a first guardrail correction condition to be required guardrail correction, calculating a lateral displacement deviation of the controlled vehicle according to the front guardrail information and the front lane line information; and
in response to determining that the front lane line information comprises both-side lane line information, the front guardrail information is not empty, and in a case where the front lane line information is determined according to a second guardrail correction condition to be not required guardrail correction, calculating a lateral displacement deviation of the controlled vehicle according to the front lane line information.

2. The method according to claim 1, wherein the determining a lateral displacement deviation of the controlled vehicle according to at least one of the front guardrail information and the front target vehicle information comprises:
in response to determining that the front guardrail information is empty and the front lane line information comprises one-side lane line information, determining a type of a one-side lane line; and
determining a lateral displacement deviation of the controlled vehicle according to the type of the one-side lane line.

3. The method according to claim 1, wherein the determining a lateral displacement deviation of the controlled vehicle according to at least one of the front guardrail information and the front target vehicle information comprises:
in response to determining that the front guardrail information is empty and the front lane line information does not comprise one-side lane line information, calculating a lateral displacement deviation of the controlled vehicle according to the front target vehicle information.

4. The method according to claim 3, wherein the calculating a lateral displacement deviation of the controlled vehicle according to the front target vehicle information comprises:
in response to determining that a front target vehicle exists, determining a vehicle longitudinal distance between the controlled vehicle and the front target vehicle; and
in response to determining that the vehicle longitudinal distance is less than or equal to a set distance threshold, determining a lateral displacement deviation of the controlled vehicle according to the front target vehicle information.

5. The method according to claim 4, further comprising:
in response to determining that the front guardrail information and the front target vehicle information do not exist, or determining that the vehicle longitudinal distance is greater than the set distance threshold, obtaining current vehicle status information of the controlled vehicle; and
controlling the controlled vehicle to travel according to the current vehicle status information.

6. The method according to claim 5, wherein the controlling the controlled vehicle to travel according to the current vehicle status information comprises:

maintaining a current travelling status of the controlled vehicle according to the current vehicle status information;

obtaining a current vehicle status maintenance time; wherein the current vehicle status maintenance time is a duration of maintaining the current travelling status of the controlled vehicle;

in response to determining that the current vehicle status maintenance time is less than a set time threshold, and in a case where the controlled vehicle obtains none of front lane line information, front guardrail information, and front target vehicle information in the process of maintaining the current travelling status, returning to perform the operation of maintaining the current travelling status of the controlled vehicle according to the current vehicle status information until a current vehicle status maintenance time is determined to be equal to the set time threshold; and in response to determining that the current vehicle status maintenance time is less than a set time threshold, and in a case where the controlled vehicle obtains at least one of front lane line information, front guardrail information and front target vehicle information in the process of maintaining the current travelling status, returning to perform the operation of determining a lateral displacement deviation of the controlled vehicle according to at least one of the front lane line information and the front guardrail information, or returning to perform the operation of calculating a lateral displacement deviation of the controlled vehicle according to the front target vehicle information.

7. The method according to claim 1, wherein the determining a lateral displacement deviation of the controlled vehicle according to at least one of the front guardrail information and the front target vehicle information comprises:

in response to determining that the front guardrail information is not empty and the front lane line information comprises one-side lane line information, calculating a lateral displacement deviation of the controlled vehicle according to the front guardrail information and the one-side lane line information.

8. The method according to claim 1, wherein determining a front guardrail in the front guardrail information based on the following manner:

in response to determining that the front guardrail information comprises one-side front guardrail information, and in a case where a distance between an one-side front guardrail and the controlled vehicle is less than a half width of a single lane, determining that the one-side front guardrail is the front guardrail;

in response to determining that the front guardrail information comprises both-side front guardrail information, and in a case where a distance between a target-side front guardrail in the both-side front guardrails and the controlled vehicle is less than the half width of the single lane, determining that the target-side front guardrail is the front guardrail; and in response to determining that the front guardrail information comprises both-side front guardrail information, and in a case where distances between the controlled vehicle and the both-side front guardrails are each less than the half width of the single lane, determining that a one-side front guardrail in the both-side front guardrails is the front guardrail.

9. The method according to claim 1, wherein the controlling the controlled vehicle to travel according to the lateral displacement deviation comprises:

calculating an expected steering angle of the controlled vehicle according to the lateral displacement deviation; and controlling the controlled vehicle to travel according to the expected steering angle.

10. An electronic device, comprising: at least one processor; and a storage apparatus configured to store at least one program, wherein the at least one processor is configured to execute the at least one program to implement a vehicle control method, wherein the vehicle control method comprises:

obtaining front lane line information and front guardrail information of a controlled vehicle;

determining a lateral displacement deviation of the controlled vehicle according to at least one of the front lane line information and the front guardrail information according to at least one of the front lane line information and the front guardrail information, wherein the lateral displacement deviation is a lateral distance between a current position of the controlled vehicle and a preview position of the controlled vehicle; and controlling the controlled vehicle to travel according to the lateral displacement deviation;

wherein the determining a lateral displacement deviation of the controlled vehicle according to at least one of the front lane line information and the front guardrail information comprises:

in response to determining that the front lane line information does not comprise both-side lane line information, determining front target vehicle information; and determining a lateral displacement deviation of the controlled vehicle according to at least one of the front guardrail information and the front target vehicle information;

wherein the determining a lateral displacement deviation of the controlled vehicle according to at least one of the front guardrail information and the front target vehicle information comprises:

in response to determining that the front guardrail information is not empty and the front lane line information does not comprise one-side lane line information, calculating a lateral displacement deviation of the controlled vehicle according to the front target vehicle information;

wherein the calculating a lateral displacement deviation of the controlled vehicle according to the front target vehicle information comprises:

in response to determining that the front target vehicle information is not empty, determining a vehicle longitudinal distance between the controlled vehicle and the front target vehicle;

in response to determining that the vehicle longitudinal distance is less than or equal to a set distance threshold, calculating a lateral displacement deviation of the controlled vehicle according to the front target vehicle information; and in response to determining that no front target vehicle exists or the vehicle longitudinal distance is greater than the set distance threshold, calculating a lateral displacement deviation of the controlled vehicle according to the front guardrail information;

wherein the determining a lateral displacement deviation of the controlled vehicle according to at least one of the front lane line information and the front guardrail information comprises:

in response to determining that the front lane line information comprises both-side lane line information and the front guardrail information is not empty, and in a case where the front lane line information is determined according to a first guardrail correction condition to be required guardrail correction, calculating a lateral displacement deviation of the controlled vehicle according to the front guardrail information and the front lane line information; and in response to determining that the front lane line information comprises both-side lane line information, the front guardrail information is not empty, and in a case where the front lane line information is determined according to a second guardrail correction condition to be not required guardrail correction, calculating a lateral displacement deviation of the controlled vehicle according to the front lane line information.

11. A non-transitory computer storage medium storing a computer program, wherein the computer program, when being executed by a processor, implements a vehicle control method, wherein the vehicle control method comprises:

obtaining front lane line information and front guardrail information of a controlled vehicle;

determining a lateral displacement deviation of the controlled vehicle according to at least one of the front lane line information and the front guardrail information according to at least one of the front lane line information and the front guardrail information, wherein the lateral displacement deviation is a lateral distance between a current position of the controlled vehicle and a preview position of the controlled vehicle; and controlling the controlled vehicle to travel according to the lateral displacement deviation;

wherein the determining a lateral displacement deviation of the controlled vehicle according to at least one of the front lane line information and the front guardrail information comprises:

in response to determining that the front lane line information does not comprise both-side lane line information, determining front target vehicle information; and determining a lateral displacement deviation of the controlled vehicle according to at least one of the front guardrail information and the front target vehicle information;

wherein the determining a lateral displacement deviation of the controlled vehicle according to at least one of the front guardrail information and the front target vehicle information comprises:

in response to determining that the front guardrail information is not empty and the front lane line information does not comprise one-side lane line information, calculating a lateral displacement deviation of the controlled vehicle according to the front target vehicle information;

wherein the calculating a lateral displacement deviation of the controlled vehicle according to the front target vehicle information comprises:

in response to determining that the front target vehicle information is not empty, determining a vehicle longitudinal distance between the controlled vehicle and the front target vehicle;

in response to determining that the vehicle longitudinal distance is less than or equal to a set distance threshold, calculating a lateral displacement deviation of the controlled vehicle according to the front target vehicle information; and in response to determining that no front target vehicle exists or the vehicle longitudinal distance is greater than the set distance threshold, calculating a lateral displacement deviation of the controlled vehicle according to the front guardrail information;

wherein the determining a lateral displacement deviation of the controlled vehicle according to at least one of the front lane line information and the front guardrail information comprises:

in response to determining that the front lane line information comprises both-side lane line information and the front guardrail information is not empty, and in a case where the front lane line information is determined according to a first guardrail correction condition to be required guardrail correction, calculating a lateral displacement deviation of the controlled vehicle according to the front guardrail information and the front lane line information; and in response to determining that the front lane line information comprises both-side lane line information, the front guardrail information is not empty, and in a case where the front lane line information is determined according to a second guardrail correction condition to be not required guardrail correction, calculating a lateral displacement deviation of the controlled vehicle according to the front lane line information.

12. The electronic device according to claim 10, wherein the determining a lateral displacement deviation of the controlled vehicle according to at least one of the front guardrail information and the front target vehicle information comprises:

in response to determining that the front guardrail information is empty and the front lane line information comprises one-side lane line information, determining a type of a one-side lane line; and determining a lateral displacement deviation of the controlled vehicle according to the type of the one-side lane line.

13. The electronic device according to claim 10, wherein the determining a lateral displacement deviation of the controlled vehicle according to at least one of the front guardrail information and the front target vehicle information comprises:

in response to determining that the front guardrail information is empty and the front lane line information does not comprise one-side lane line information, calculating a lateral displacement deviation of the controlled vehicle according to the front target vehicle information.

14. The electronic device according to claim 13, wherein the calculating a lateral displacement deviation of the controlled vehicle according to the front target vehicle information comprises:

in response to determining that a front target vehicle exists, determining a vehicle longitudinal distance between the controlled vehicle and the front target vehicle; and in response to determining that the vehicle longitudinal distance is less than or equal to a set distance threshold, determining a lateral displacement deviation of the controlled vehicle according to the front target vehicle information.

* * * * *